United States Patent [19]

Sato et al.

[11] Patent Number: 4,678,323
[45] Date of Patent: Jul. 7, 1987

[54] DISTANCE MEASURING DEVICES AND LIGHT INTEGRATORS THEREFOR

[75] Inventors: Yuichi Sato, Tokyo; Tokuichi Tsunekawa, Yokohama; Takashi Kawabata, Kamakura, all of Japan

[73] Assignee: Canon Kabushiki Kaisha

[21] Appl. No.: 757,137

[22] Filed: Jul. 19, 1985

[30] Foreign Application Priority Data

Jul. 20, 1984 [JP] Japan .................................. 59-150647
Jul. 23, 1984 [JP] Japan .................................. 59-152358
Jul. 31, 1984 [JP] Japan .................................. 59-161050

[51] Int. Cl.⁴ .......................... G01C 3/08; G03B 3/00
[52] U.S. Cl. ........................................ 365/4; 354/403
[58] Field of Search .......................... 356/4; 354/403

[56] References Cited

U.S. PATENT DOCUMENTS

| | | | |
|---|---|---|---|
| 4,455,070 | 6/9184 | Ogawa | 354/403 |
| 4,479,706 | 10/1984 | Takahashi | 354/403 |
| 4,518,253 | 5/1985 | Takahashi | 354/403 |
| 4,533,227 | 8/1985 | Takahashi | 354/403 |

*Primary Examiner*—Russel E. Adams
*Attorney, Agent, or Firm*—Toren, McGeady & Associates

[57] ABSTRACT

In the disclosed distance measuring arrangement, a light projector turns on and off to illuminate an object over the ambient light during projection periods when light is projected and during space periods when light is not projected. The reflected light is detected as a function of distance by integrating projection signals representing light reflected during projection periods, integrating space signals representing light during reflected space periods, subtracting the integration space signals from the projection signals, and extracting measurements based on the subtractions. Compensation for change in ambient light between periods is obtained by changing the timing of the integrations and extractions from concidence with the projections and space periods.

56 Claims, 58 Drawing Figures

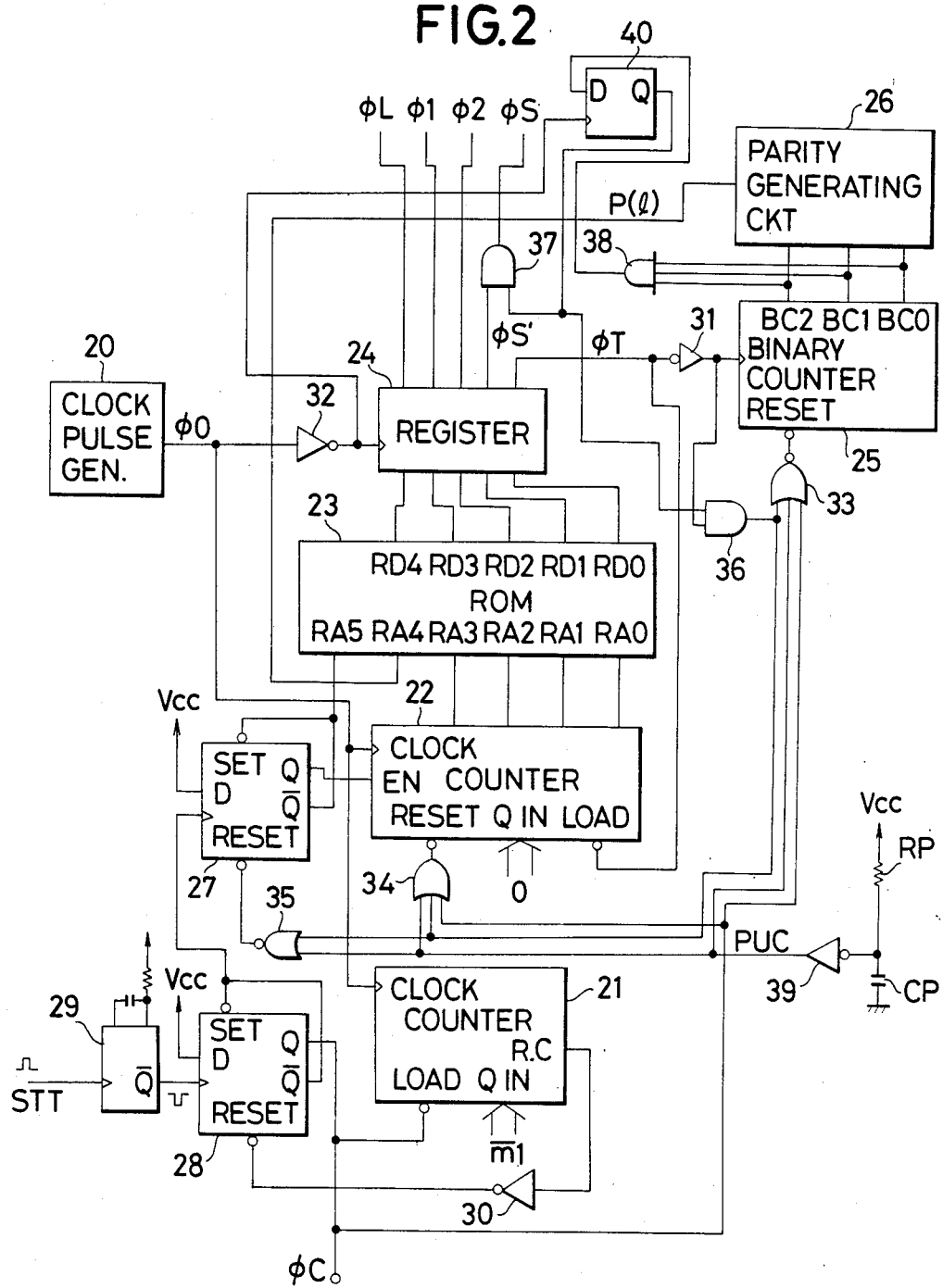

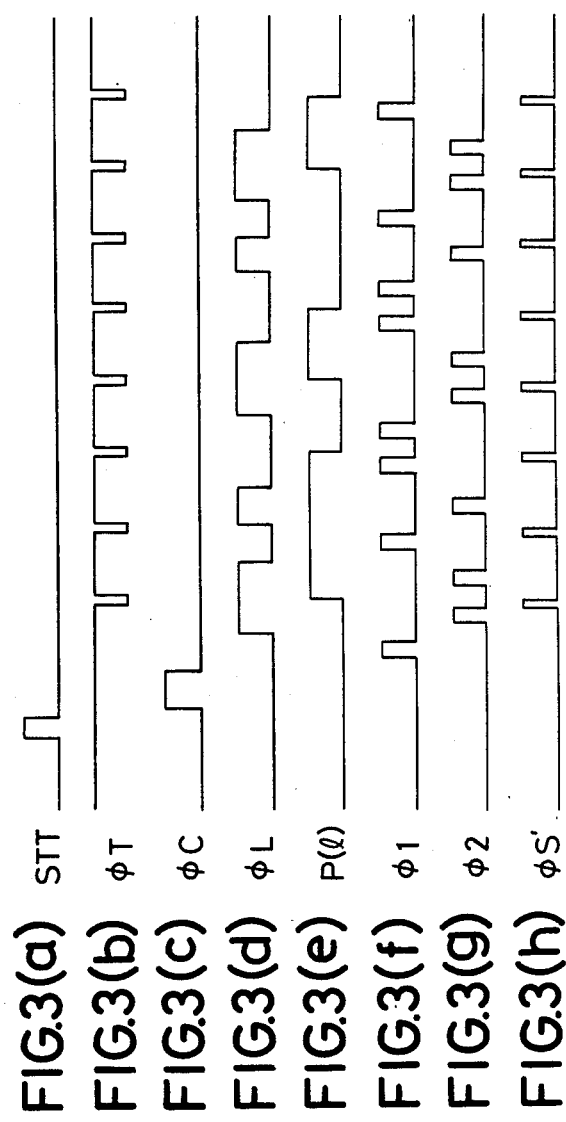

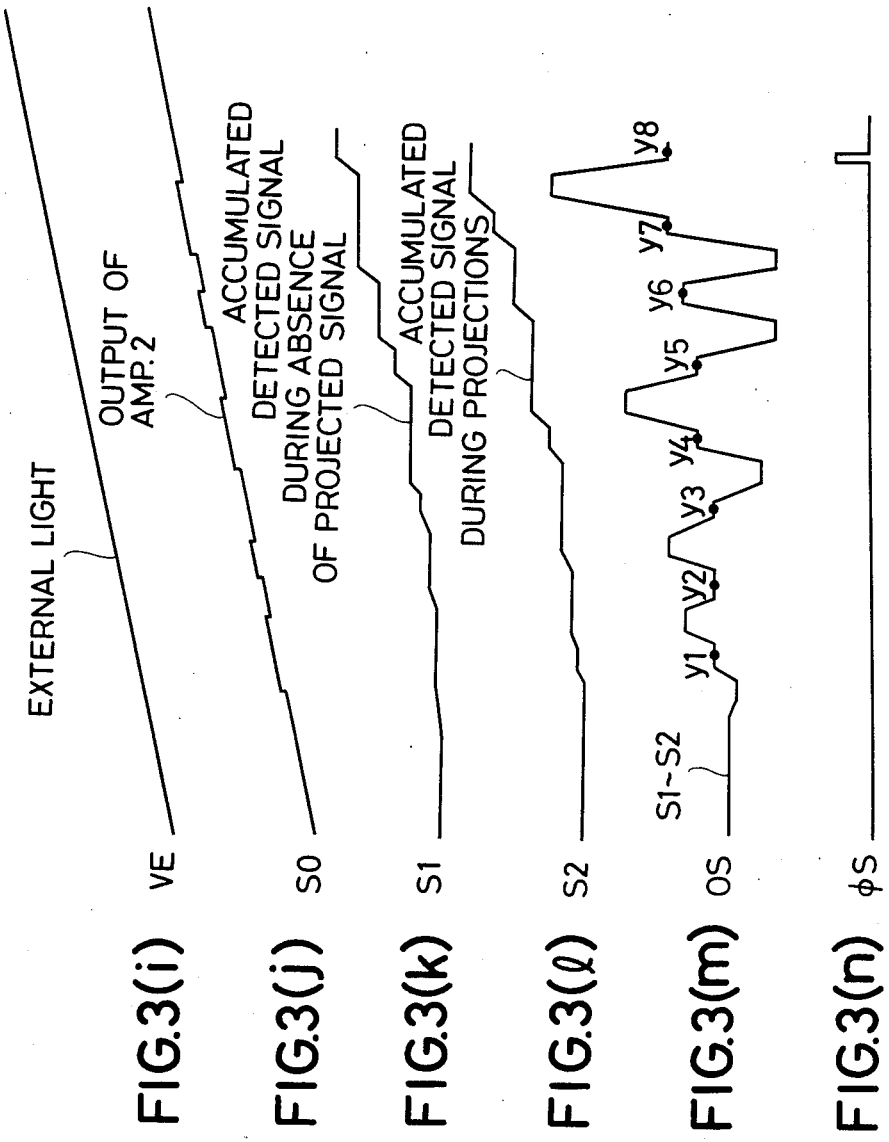

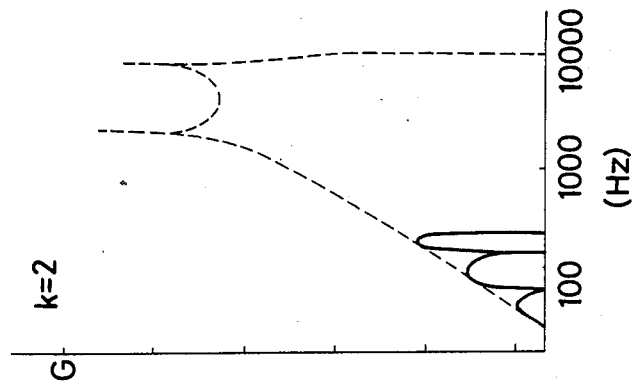
FIG.9(a) k=0
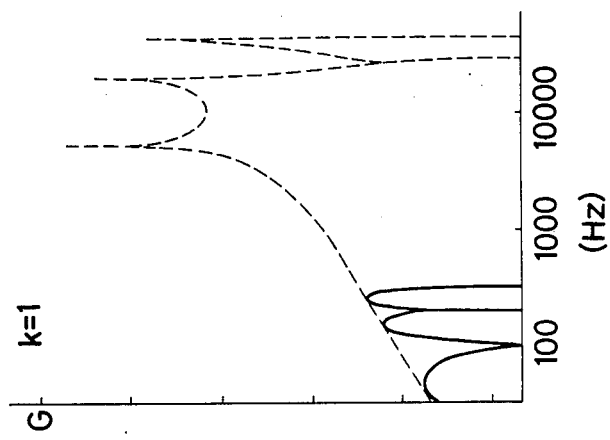
FIG.9(b) k=1
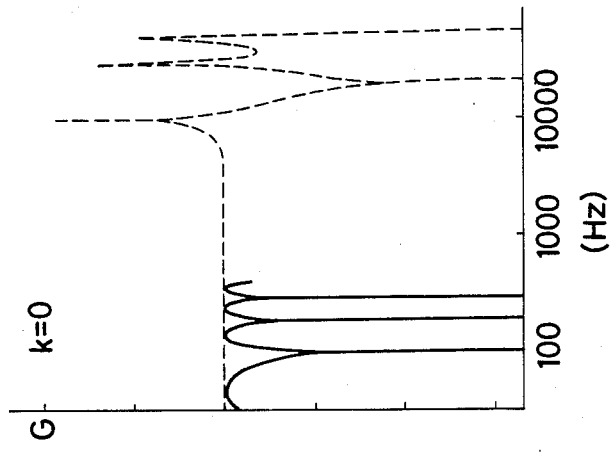
FIG.9(c) k=2

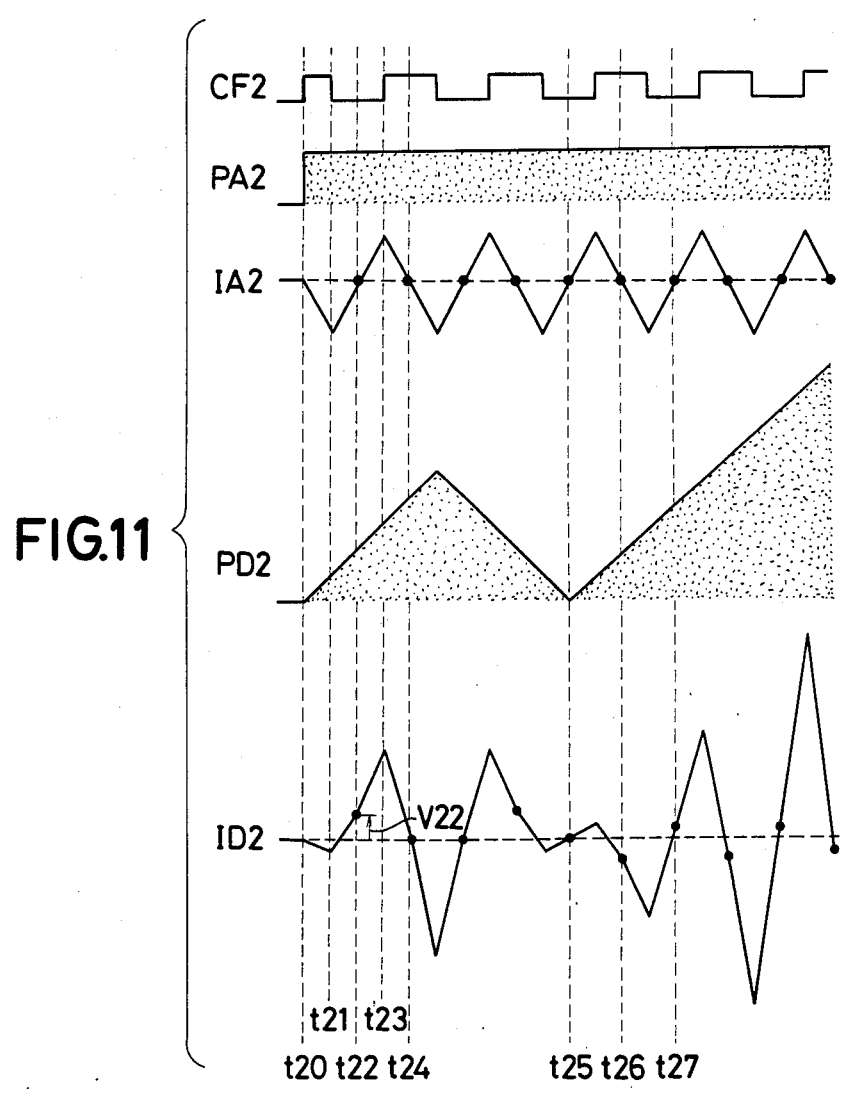

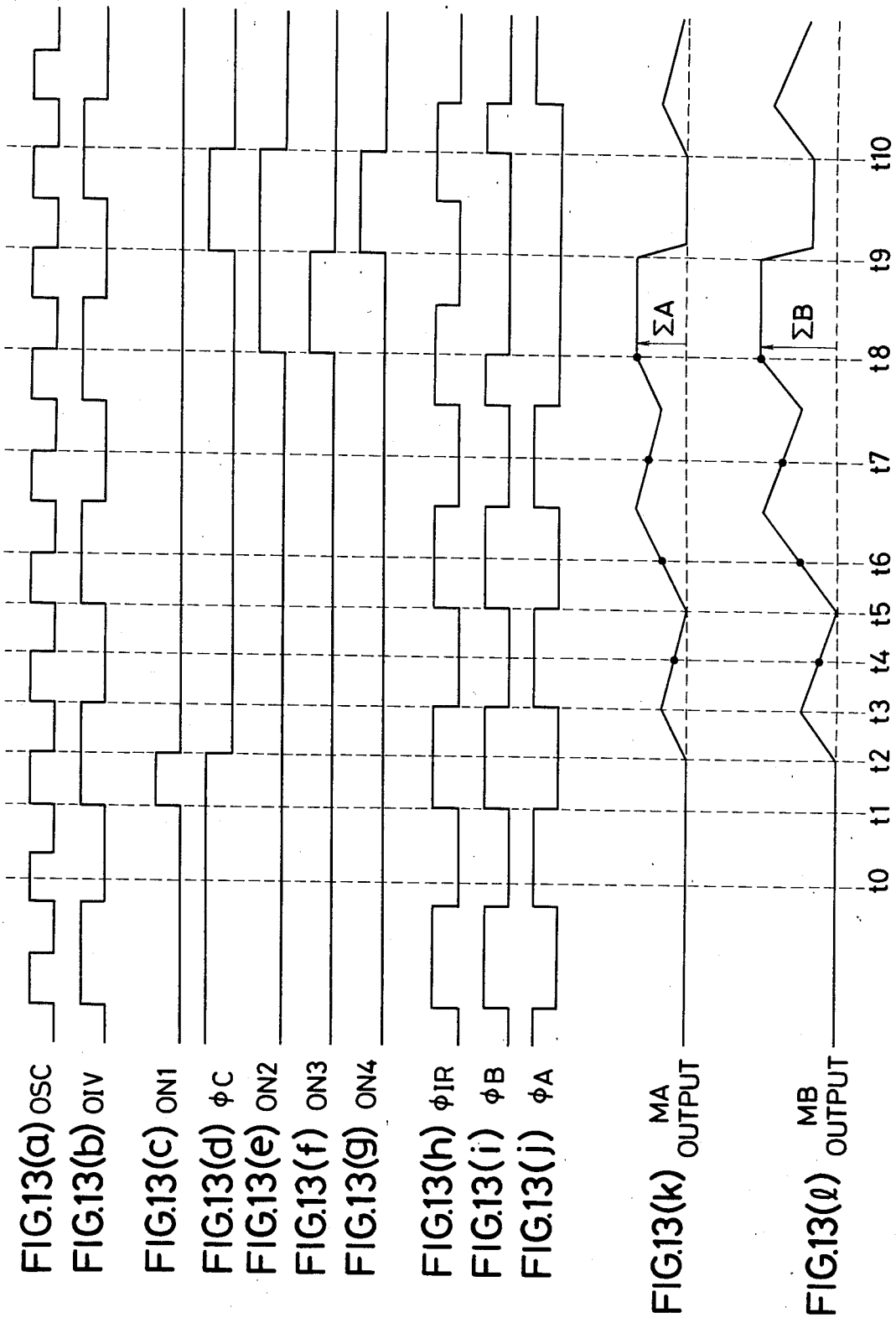

FIG.16(a) STT

DISTANCE MEASURING DEVICES AND LIGHT INTEGRATORS THEREFOR

BACKGROUND OF THE INVENTION

This invention relates to synchronous light integrating means and methods, and more particularly to a synchronous light integrating arrangement and method for removing the adverse effect of external disturbing light (light noise), and which is, for example, highly suited for the focusing device of a camera that obtains its object distance information by projecting light onto an object to be photographed and detecting the light reflected from the object. The invention is also directed to cameras of the still, movie, and video type as well as sensors for industrial robots, and other devices using distance measurements.

Various methods and means have been proposed for these purposes. One arrangement alternately repeats a first integration mode which involves integrating light reflected from an object as a result of a light source intermittently projecting light onto the object, and a second integration mode which involves integrating the light from the object when light is not projected. The integrated value thus obtained is accumulated for each operation in the first integration mode, and the distance to the object, the reflection factor of the object, etc., are measured from the difference between the accumulated integration value obtained in the first integration mode and an accumulated integration value obtained in the second integration mode. Such a synchronous integrating arrangement appears in the camera distance detecting device disclosed, for example, in Japanese Laid-Open Patent Application No. Sho 54-151829. Here, light is projected on an object to be photographed, the resultant light reflected from the object is detected to obtain distance information, and a photo-taking lens is adjusted to focus on the object. An active focusing device of this type, which projects light, requires separating the component of the reflected light arising from the projected light and the component resulting from ambient light sources such as the sun, artificial lighting, etc., to detect the projected light. This process may be called external light removal, or light noise removal.

The light projected onto the object is dispersed over the object. The quantity S of projected light, as detected by the detector of the focusing device, is inversely proportional to the square of the object distance R. Accordingly, in order to focus on a far away object, the projected light must be accurately detected. The detection accuracy hinges upon the removal of the external light or light noise. The external light removal is thus an important factor in focusing accuracy.

Generally, the external light has a large DC component and substantial fluctuations as compared with the projected light. The fluctuations result from the flicker of the external light source and movement of objects including those objects to be photographed. The salient cause of light source flicker is that inherent in the fluctuating voltage of an electric or fluorescent lamp. It includes many frequency components of 100 Hz or 120 Hz.

The aforementioned prior art attempts to remove the external light component for accurate detection of the projected signal light component by employing a synchronous integration method. Here, the projector blinks at a relatively high frequency to produce an intermittent signal light. Suitable means accumulate detected signal V1, which is obtained between projections of signal light, and detection signal V2 which is obtained while the signal light is being projected. A difference D between the signal V1 and V2 represents the quantity or value of the projected signal light. Assuming that a detected signal obtained at the j-th cycle of accumulation between signal light projections is V1j, and accumulated signal between light projections is V1, a detected signal obtained for the j-th cycle accumulation during signal light projection is V2j, and the accumulated signal obtained while signal light is projected is V2, the signals may be expressed as follows:

$$V1 = \sum_{j=1}^{N} V1j$$

$$V2 = \sum_{j=1}^{N} V2j$$

$$D = V2 - V1$$

The accumulated signal V1 represents only the external light, and the other accumulated signal V2, the combination of the external light and the signal light. Therefore, if the quantity of external light is assumed to be VE, and that of the signal light to be s, the detected signal V1j obtained between signal light projections and the detected signal V2j obtained during signal light projection can be expressed as shown:

V1j = VEj (with the signal light not projected)

V2j = VEj' + s (with the signal light projected)

What is to be obtained is the sum S of the signal component sj (=s). The sum signal S can be expressed as follows:

$$S = \sum_{j=1}^{N} s = Ns$$

Meanwhile, the difference signal D can be expressed as follows:

$$D = V2 - V1 = \sum_{j=1}^{N} (V2j - V1j)$$

$$= \sum_{j=1}^{N} (VEj' - VEj) + Ns$$

The difference E between the difference signal D and the sum signal S thus represents an error in detecting the signal light, and can be expressed as follows:

$$E = D - S = \sum_{j=1}^{N} (VEj' - VEj)$$

If the external light VE varies relatively slowly and the VEj' − VEj is small, the signal light detection error becomes small. This is as shown in FIG. 4. Here hatched parts VE1 and VE2 ... represent the values obtained with no signal light projected, i.e., between projected signal light and cross-hatched parts VE1' and VE2' ... represent the values obtained with projected signal light. Other drawings are arranged in the same manner. However, where the quantity y of the external light varies linearly as shown in FIG. 5, the detection error E obtained after N accumulations is:

$$E = \sum_{j=1}^{N} (VEj' - VEj) = \sum_{j=1}^{N} h = Nh$$

The error E is proportional to the number of times N. Assuming that the signal light projection period is τc and the duty ratio of the detection signal integration time at each accumulating cycle or step is X, the integration time per accumulating step becomes Xτc. Assuming that the value of the duty ratio X is unvarying, the error h of the external light per signal light projection period becomes smaller in proportion to the period τc when the signal light projection frequency is arranged to be faster or higher. Then, according to this, the quantity sj of the signal light becomes smaller in proportion to the signal light projection period τc. This can be expressed as follows:

$$h = k1\tau c$$

$$s = k2\tau c$$

Then, the relationship between S and E S/E can be expressed as follows:

S/E=s/h=k2/k1=const.

Thus, the ratio S/E is irrelevant to the value τc and N. Therefore, where the external light varies linearly, conventional synchronous integrating systems are incapable of removing the linear variation. Further, the external light removal is not adequately accomplished with fluctuations at the relatively low frequency 100 Hz or 120 Hz of a fluorescent lamp, etc.

An object of the invention is to improve light integrating circuits, methods, distance measuring devices, cameras and other devices.

Another object of the invention is to eliminate the shortcomings of the prior art.

A general object of the invention is provide a synchronous integrating method and apparatus which is capable of accurately removing the external light component.

SUMMARY OF THE INVENTION

According to a feature of the invention, a projected signal light is repeatedly projected on an object; reflected light coming from the object as a result of the signal light projection is integrated in a first integrating mode during signal light projection (e.g. during projection periods); the light of the object is integrated in a second integrating mode in the absence of signal light projection (i.e. during space periods); and compensation for changes in ambient light is achieved by timing means which select the timing of the projection periods and the space periods, or the timing of the integration in the first and second modes.

According to another feature of the invention, the timing means determines which of the first and second integrating modes to precede the other at the n-th cycle of signal light projection in relation to the number n.

According to another feature of this invention, an additional integrating mode is used in which integration is performed either before or after a light projection mode or no light projection mode; and external light is removed with a high degree of accuracy by virtue of the additional integrating mode.

These and further features of the invention are pointed out in the claims. Other objects of this invention will become apparent from the following detailed description of preferred embodiments thereof taken in connection with the accompanying drawings.

BRIEF DESCRIPTION OF THE DRAWINGS

FIG. 2 is a circuit diagram showing by way of example the details of a control circuit included in the block diagram of FIG. 1.

FIGS. 3(a) to 3(n) are illustrations showing the operation of the apparatus shown in FIG. 1.

FIG. 9(a) is a graph showing the frequency response curve of the conventional synchronous integrating method.

FIGS. 9(b) and 9(c) are graphs showing frequency response curves of the synchronous integrating method of this invention.

FIG. 11 is collection of graphs illustrating the operation of the circuit shown in FIG. 10.

FIG. 13(a) to 13(l) are graphs showing the operation of the circuit of FIG. 10.

FIG. 16(a) to 16(l) are charts showing the operation of the synchronous integrating device shown in FIG. 14.

DETAILED DESCRIPTION OF THE PREFERRED EMBODIMENTS

Figure 1:
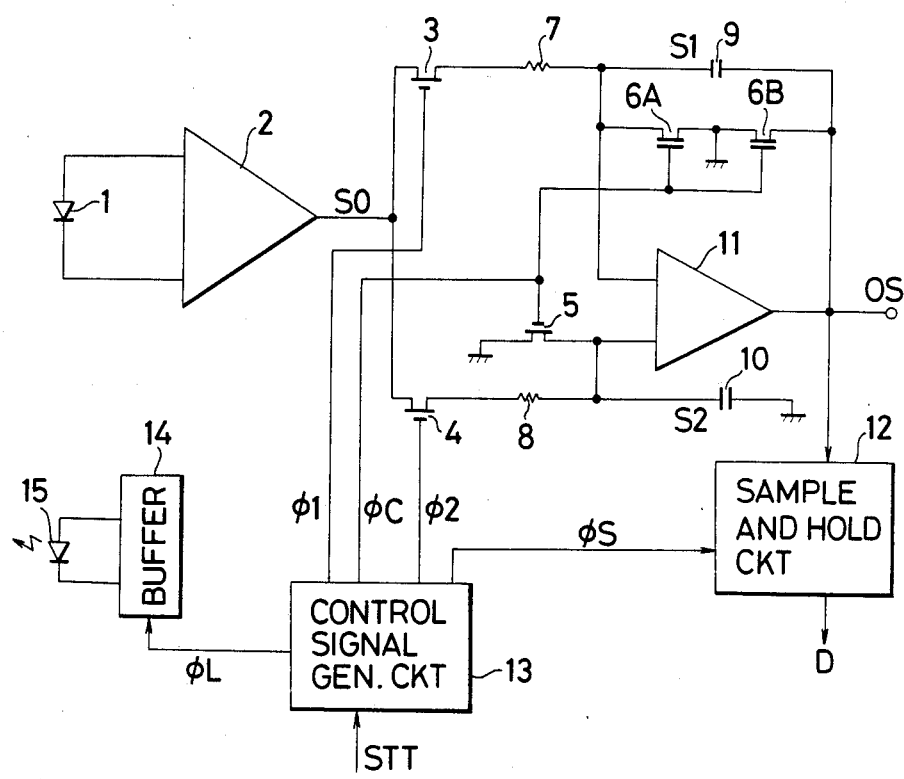
FIG. 1 is a block diagram showing an apparatus embodying the synchronous integrating method of the present invention.
Figure 4:
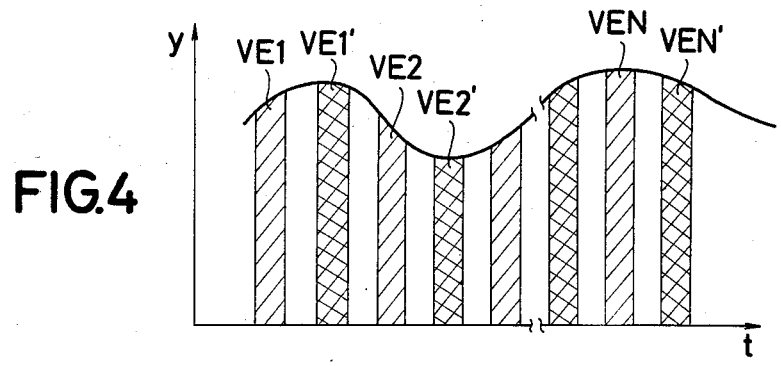
FIG. 4 is a graph showing a synchronous integration operation performed with varying external light.
Figure 5:
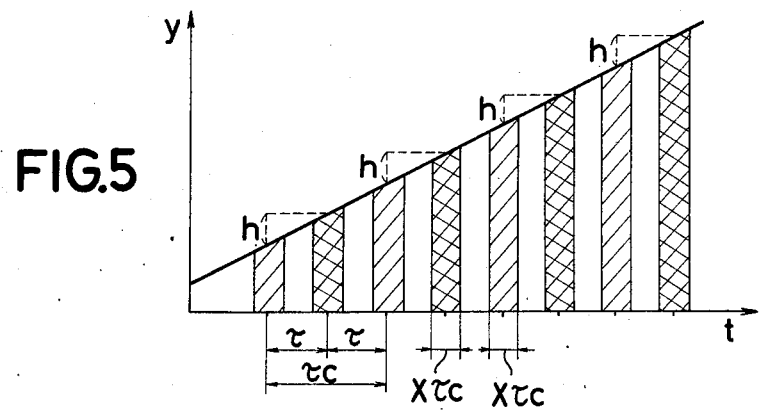
FIG. 5 is a graph showing a synchronous integration operation with linearly varying external light.
Figure 6:
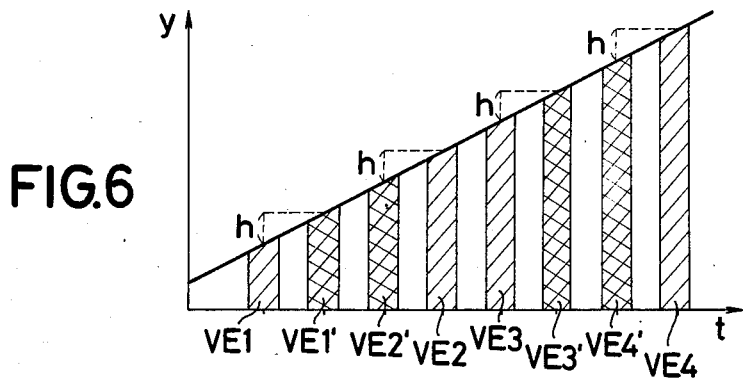
FIG. 6 is a graph showing a synchronous integration operation performed according to this invention.
Figure 10:
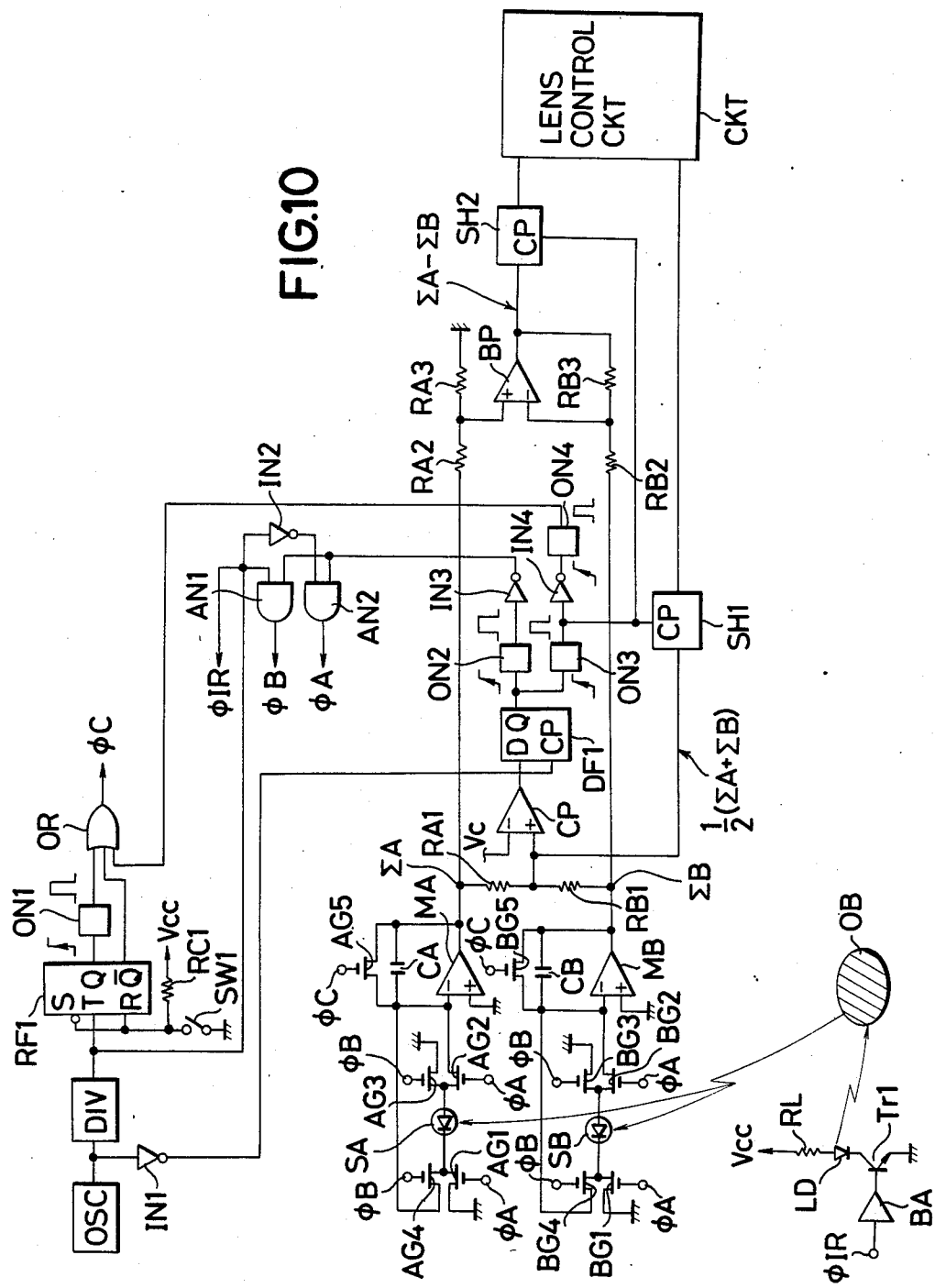
FIG. 10 is a circuit diagram showing the circuit arrangement of a modification of the apparatus to which the synchronous integrating method of this invention is applied.

FIGS. 1 and 2 illustrate one embodiment of the invention. A second embodiment is shown in FIG. 10, and a third embodiment in FIGS. 14 and 15. The invention will best be understood by first considering the synchronous integrating principles employed by each of these embodiments. A first synchronous integrating principle according to this invention involves removal of the external light by switching between the signal-light projecting integration mode M2 and the no-signal-light projecting integration mode M1 at the n-th repeating cycle or step from one to the other according to the number n and preferably to a parity signal. The details of the operating principle follows:

(1) External light varies linearly (See FIG. 6):

The decision whether to adopt the mode M1 or the mode M2 first at the n-th cycle of the repeating operation is on the basis of the parity of the lowest order bit of $(n-1)$. In other words, it is determined by whether "n" is an even number or an odd number. Then, the linearly varying external light can be completely removed by making a total repeating number N an even number. Let us assume that the external light varies linearly as shown in FIG. 6 and that the quantity of the external light obtained in the mode M1 at the j-th cycle is expressed as $VEj$ and that of the external light obtained in the other mode M2 at the j-th cycle as $VEj'$. Then, if $N=2$, the signal light detecting error E due to the external light can be expressed as follows:

$$E(2) = \sum_{j=1}^{2} (VEj' - VEj) = VE1' - VE1 + VE2' - VE2$$

$$= h - h = 0$$

In the same manner, it can be also expressed as follows:

$$E(4) = \sum_{j=1}^{4} (VEj' - VEj) = \sum_{j=1}^{2} (VEj' - VEj) + \sum_{j=3}^{4} (VEj' - VEj) = 0$$

$$= 0 + VE3' - VE3 + VE4' - VE4$$

$$= 0 + h - h$$

$$= 0$$

Generally, $E(2m)=0$. Therefore, where the external light varies linearly, the adverse effects of the external light can be eliminated by determining which of the modes M1 and M2 is to be allowed to precede the other according to the parity of the lowest order binary bit of $(n-1)$.

Figure 7:
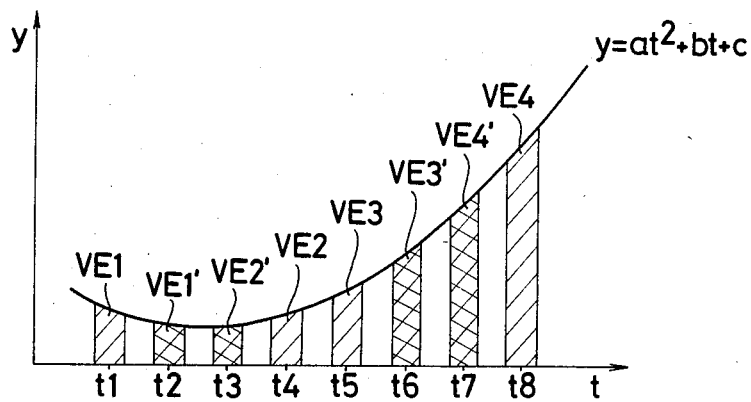
FIGS. 7 and 8 are graphs showing a synchronous integration operation carried out according to the method of this invention where the external light varies in a curve of the second order.
Figure 8:
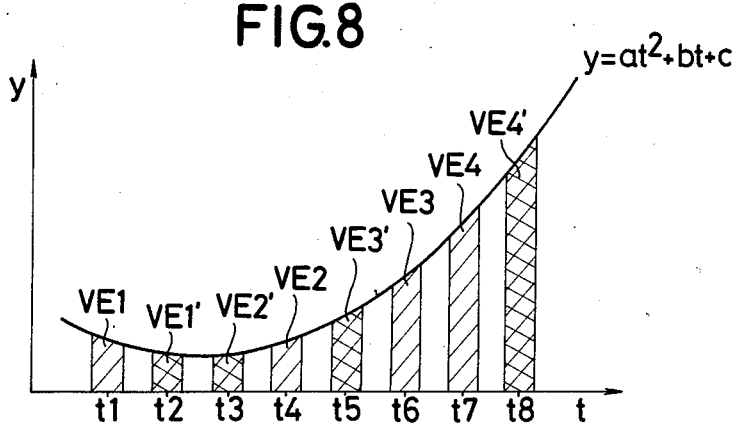

(2) External light varies quadratically (See FIGS. 7 and 8):

All the effects of quadratically varying external light can be removed by determining which of the modes M1 and M2 should be allowed to come first at the n-th cycle according to the parity of two lowest order bits of the $(n-1)$ and by changing the repeating number of times N into a value which is an integral multiple of 4. In FIGS. 7 and 8, the external light can be expressed by the quadratic equation:

$$y = at^2 + bt + c$$

FIG. 7 shows the modes M1 and M2 switched over according to the parity of the lowest order bit of the $(n-1)$. FIG. 8 shows the modes M1 and M2 switched over according to the parity of the lower two bits of the $(n-1)$. Assuming that $t_{i+1} = t_i + \tau$, the quantity of the external light is $y_i = at_i^2 + bt_i + c$ and that the detection error E is (1)E in the case of FIG. 7 and (2)E in the case of FIG. 8, the error E can be expressed as follows:

$$(1) E(4) = \sum_{j=1}^{4} (VEj' - VEj)$$

$$= y_2 - y_1 + y_3 - y_4 + y_6 - y_5 + y_7 - y_8$$

$$= a(t_2^2 - t_1^2 + t_3^2 - t_4^2 + t_6^2 - t_5^2 + t_7^2 - t_8^2) +$$

$$\qquad b(t_2 - t_1 - t_3 - t_4 + t_6 - t_5 + t_7 - t_8)$$

$$= a\tau\{(t_2 + t_1) - (t_3 + t_4) + (t_6 + t_5) - (t_7 + t_8)\} +$$

$$\qquad b\tau(1 - 1 + 1 - 1)$$

$$= a\tau(-2\tau - 2\tau)$$

$$= -4a\tau^2$$

$$(2) E(4) = \sum_{j=1}^{4} (VEj' - VEj)$$

$$= (y_2 - y_1 + y_3 - y_4) - (y_6 - y_5 + y_7 - y_8)$$

$$= a(t_2^2 - t_1^2 + t_3^2 - t_4^2 - t_6^2 + t_5^2 - t_7^2 + t_8^2)$$

$$\qquad b(t_2 - t_1 + t_3 - t_4 - t_6 + t_5 - t_7 + t_8)$$

$$= a\tau\{(t_2 + t_1) - (t_3 + t_4) - (t_6 + t_5) + (t_7 + t_8)\} +$$

$$\qquad b\tau(1 - 1 - 1 + 1)$$

$$= a\tau(-2\tau + 2\tau)$$

$$= 0$$

By generalizing the above, the error E can be expressed as follows when the N is 4m times and the external light quadratically varies:

$$(1) E(4m) = -4m\, a\tau^2$$

$$(2) E(4m) = 0$$

The adverse effect of the quadratic variations of the external light thus can be removed.

3. External light variations with a curve of higher order:

Where the external light varies with a curve of higher order, the decision as to which of the modes M1 and M2 should be allowed to come first at the n-th cycle is made according to the parity of the lower order k bits of the $(n-1)$, $(k \geq 2)$, and by making the repeating number of times N into a value which is an integral number of times of $2^k$. This arrangement can eliminate the effect of the external light variations which take place in a functional manner of k order. The details of this arrangement are omitted here. Generally, the effect of any variations in the external light that can be approximated by a k order function can be adequately eliminated. Normally, however, a practical effect can be sufficiently attained by removing the external light by setting the function at $k=2$ to 3 or thereabout.

The advantageous effect attainable by the above stated method in removing the external light is as shown in frequency characteristic in FIGS. 9(a), 9(b) and 9(c). As is apparent from these illustrations, the external light of a relatively low frequency 100 Hz–120 Hz or thereabout can be sufficiently removed at $k=2$. In the case of these drawings, the number of times for repeating the modes M1 and M2 is assumed to be 100 and the repeating period to be $\tau c = 2\tau = 100$ μsec.

In the drawings, FIG. 9(a) shows the response characteristic of the conventional synchronous integration circuit for the frequency of the external light. The ordinate shows the frequency response component of an output signal and the obscissa the external light frequency. FIGS. 9(b) and 9(c) show the response characteristic relative to the external light frequency of a circuit arranged according to the synchronous integrating method of this invention, wherein either the integration mode during the light projection and the integration mode during no light project precedes the other mode at the n-th cycle of integrating operation according to the parity of the lower order k bits of (n−1). The response characteristic shown in FIG. 9(b) is obtained for the case k=1 while that of FIG. 9(c) is obtained for the case k=2. Comparison of FIGS. 9(a), 9(b) and 9(c) clearly shows the above stated advantageous effect of external light removal.

The foregoing discussion of the principle of the invention describes the integrating modes which obtain under a light projected condition and a no light projected condition. These conditions may be described as the "projection periods" and "space periods". However, the same external light removing effect is attainable with the no light projected condition replaced with a condition in which a predetermined limited quantity of light, say, 10 to 50% of the light is projected. In short, the removal of external light can be carried out on the basis of the concept described in the foregoing by using any additional integrating mode which differs from the integration mode in the light projected condition.

While the operating principles of this invention are set forth above, the following describes a first embodiment of this invention with reference to FIGS. 1, 2 and 3. In FIGS. 1 and 2, a light receiving photo-sensitive sensor 1 receives both external and projected signal light reflected by an object. A pre-amplifier 2 amplifies a signal photo-electric-converted by the sensor 1. The circuit also includes analog gates 3, 4, 5, 6A, and 6B, resistors 7 and 8; integrating capacitors 9 and 10; a differential amplifier 11; a sample-and-hold circuit 12; a control signal generating circuit 13; a light source driving buffer 14; and a projection light source 15. An accumulated integration signal S1 is obtained by accumulating detected signals which occur when no signal light is projected, i.e., between light projections. An accumulated integration signal S2 results from accumulating detected signals obtained when the signal light is projected. Other signals appearing in this circuit are the output OS of the differential amplifier 11; an accumulated signal sampling pulse φS; a clear pulse φC for resetting the capacitors 9 and 10; gate switching pulses φ1 and φ2 for opening and closing the gates 3, 4, 5 and 6; a light source driving pulse φL; and a difference signal output D obtained after synchronous integration.

FIG. 2 shows details of the control signal generating circuit 13 of FIG. 1. In the circuit 13, a clock pulse generator 20 generates reference clock pulses φ0 to counters 21 and 22. The circuit further includes a ROM 23; a register 24; and a counter 25. A parity generating circuit 26 is, for example, a product of Texas Instruments Inc. designated SN74LS280. Other parts of the circuit are D flip-flops 27, 28 and 40; a monostable multivibrator 29; inverters 30, 31, 32 and 39; 3-input type NOR circuits 33 and 34; a 2-input type NOR circuit 35; 2-input type AND circuits 36 and 37; and a 3-input type AND circuit 38. The ROM 23 has data written therein as shown in Table 1.

FIGS. 3(a) to 3(n) are timing graphs of the variables shown, e.g., STT, φT, etc., along the same time axis. In FIG. 3(a), shows a synchronous integration start pulse STT. In FIG. 3(e) a symbol P(l) indicates a parity obtained when the count output of the binary counter 25 is at 1. The illustrations show by way of example signal outputs obtained when the value VE varies linearly as shown in FIG. 3(a). Further, for the sake of simplification of the illustration, the repeating number of times N (repetition rate) is shown as 8 times or repetitions. However, it needs not be 8 times. The embodiment described above operates in the following manner:

In FIG. 1, when the synchronous integration start pulse STT, shown in FIG. 3(a), is supplied to the control signal generating circuit 13. The latter first produces the clear pulse signal φC of FIG. 3(c) to clear the signal integrating capacitors 9 and 10 via the gates 5 and 6. Next, the circuit 13 supplies the light source driving signal φL shown in FIG. 3(d) to the light source 15 via the buffer 14. The light source 15 now blinks or flickers on and off according to the signal φL. A signal light corresponding to the drive signal φL of FIG. 3(d) is projected from the light source onto the object. The object is also illuminated by ambient or external light VE which may, for example, follow the course shown in FIG. 3(i).

The circuit 13 applies the pulses φ1 and φ2 such as those of FIGS. 3(f) and 3(g) to the gates 3 and 4 in synchronism with the on-off flicker of the light source 15. In a signal light projecting integrating mode, the signal φ2 opens the gate 4. The light receiving sensor detects the projected signal light and the result is amplified by the amplifier 2. The amplified signal is stored at the capacitor 10 via the open (conductive) gate 4 and resistor 8. This produces the signal S2 shown in FIG. 3(l). In the no-signal light projected integrating mode in which no signal light is projected from the light source, pulse signals φ1 opens the gate 3. The light receiving sensor 1 detects the light, and the amplifier 2 amplifies the signal thus obtained. A capacitor 9 receives the amplified signal thus obtained via the resistor 7 and stores it as shown by S1 in FIG. 3(k). The capacitors 9 and 10 accumulate the signals S1 and S2 thus received. The accumulated total signal detected by the sensor 1 and amplified by the amplifier 2 is shown as S0 in FIG. 3(j).

The amplifier 11 forms the difference between the signals S2 and S1 as a signal OS such as shown in FIG. 3(m). With the integrating processes repeated a predetermined number of times such as 8, the signal OS is sampled by the pulse signal φS of FIG. 3(n) and held at the sample-and-hold circuit 12. The circuit 12 then produces a sample-and-hold output D. With the pulse signal φS, the control operation of the control signal generating circuit ends.

In FIG. 2 when the synchronous integration start pulse STT is supplied to the monostable multivibrator 29, the terminal Q of the multivibrator 29 produces a negative pulse signal. The rise of this pulse signal sets the D flip-flop (hereinafter referred to as D-FF) 28. The level of the output Q of the D-FF 28 then goes high (hereinafter also referred to as H).

Meanwhile, the terminal "load" of the counter 21 is low (hereinafter referred to as L) before the D-FF 28 is set. While the terminal "load" is low, the counter 21 is loaded to a value m1 with reference clock pulses which are supplied via the input terminal "clock" of the counter 21. The counter 21 does not up count while the terminal "load" remains low. When the level of the output Q of the D-FF 28 becomes high, the level of the terminal "load" of the counter 21 goes high to allow the counter 21 to up count in response to the clock pulses $\phi 0$. When the counter 21 up counts m1 times, the count value of the counter 21 reaches a maximum value and the level of the ripple-through terminal RC of the counter 21 swings high. Then the level of the reset terminal of the D-FF 28 goes low via the inverter 30. The D-FF 28 is thus reset and the level of the output terminal Q of the D-FF 28 goes low. This causes the level of the terminal "load" of the counter 21 to become low. Then, the counter no longer counts up, with the counter being loaded with a suitable value m1. The pulse STT supplied in this manner, forms the clear pulse signal $\phi C$ as shown in FIG. 3(b). When the level of the clear pulse $\phi C$ becomes high, the counters 22 and 25 are reset. Further, when a power supply is switched on, these counters are also reset by the output PUC of a power-up-clear circuit which is formed by a resistor RP, a capacitor CP and an inverter 39. The output PUC of the power-up-clear circuit resets the D-FF 27 via the NOR gate 35.

When the clear pulse signal $\phi C$ falls, the level of the output $\overline{Q}$ of the D-FF 28 swings from low to high. A rising pulse is applied to the clock terminal of the D-FF 27 to set the D-FF 27. This enables the counter 22 to count up in response to the pulses $\phi 0$. The up count begins from zero because the counter 22 has been reset into an initial state.

The output of the counter 22 is applied to the addresses RAO–RA3 of the ROM 23. The addresses of the ROM 23 are thus counted or addressed upward one after another. The address RA5 of the ROM 23 is determined or addressed by the D-FF 27 which remains low while the D-FF 27 is set. The address RA5 becomes high when the D-FF 27 is reset. Another address RA4 of the ROM23 is determined by the output P(l) of the parity generating circuit 26 as shown, for example, in FIG. 3(e). In the initial condition, since the counter 25 is then reset, the parity generating circuit 26 receives a "0" input and produces a "0" output. Therefore, the address RA4 is 0. Accordingly, in the initial condition, all the addresses RAO–RA5 of the ROM 23 are at "0". In the above stated instance, among the data of the ROM 23, a datum RD0 alone is at "1" while others are at "0" as shown in Table 1 below:

TABLE 1

| Addresses | | | | | | Data | | | | |
|---|---|---|---|---|---|---|---|---|---|---|
| RA5 | RA4 | RA3 | RA2 | RA1 | RA0 | RD4 | RD3 | RD2 | RD1 | RD0 |
| 0 | 0 | 0 | 0 | 0 | 0 | 0 | 0 | 0 | 0 | 1 |
| 0 | 0 | 0 | 0 | 0 | 1 | 0 | 0 | 0 | 0 | 1 |
| 0 | 0 | 0 | 0 | 1 | 0 | 0 | 1 | 0 | 0 | 1 |
| 0 | 0 | 0 | 0 | 1 | 1 | 0 | 1 | 0 | 0 | 1 |
| 0 | 0 | 0 | 1 | 0 | 0 | 0 | 0 | 0 | 0 | 1 |
| 0 | 0 | 0 | 1 | 0 | 1 | 1 | 0 | 0 | 0 | 1 |
| 0 | 0 | 0 | 1 | 1 | 0 | 1 | 0 | 0 | 0 | 1 |
| 0 | 0 | 0 | 1 | 1 | 1 | 1 | 0 | 1 | 0 | 1 |
| 0 | 0 | 1 | 0 | 0 | 0 | 1 | 0 | 1 | 0 | 1 |
| 0 | 0 | 1 | 0 | 0 | 1 | 1 | 0 | 0 | 1 | 0 |
| 0 | 1 | 0 | 0 | 0 | 0 | 1 | 0 | 0 | 0 | 1 |
| 0 | 1 | 0 | 0 | 0 | 1 | 1 | 0 | 0 | 0 | 1 |
| 0 | 1 | 0 | 0 | 1 | 0 | 1 | 0 | 1 | 0 | 1 |
| 0 | 1 | 0 | 0 | 1 | 1 | 1 | 0 | 1 | 0 | 1 |
| 0 | 1 | 0 | 1 | 0 | 0 | 1 | 0 | 0 | 0 | 1 |
| 0 | 1 | 0 | 1 | 0 | 1 | 0 | 0 | 0 | 0 | 1 |
| 0 | 1 | 0 | 1 | 1 | 0 | 0 | 0 | 0 | 0 | 1 |
| 0 | 1 | 0 | 1 | 1 | 1 | 0 | 1 | 0 | 0 | 1 |
| 0 | 1 | 1 | 0 | 0 | 0 | 0 | 1 | 0 | 0 | 1 |
| 0 | 1 | 1 | 0 | 0 | 1 | 0 | 0 | 0 | 1 | 0 |
| Other Addresses | | | | | | 0 | 0 | 0 | 0 | 0 |

The above stated data are set at and produced by the register 24 in synchronism with the fall of the pulses $\phi 0$. Since the datum RDO of the ROM 23 is "1", the signal supplied to the register 24 is high and the level of the output $\phi T$ shown in FIG. 3(b) goes. At that time, since the counter 22 has been relieved of a load, the counter 22 counts up when with the next rise of the pulses $\phi 0$. The countup process is repeated until the datum RO0 becomes "0". With the countup process repeated 10 times, the datum RO0 becomes "0". Then, the level of the pulse signal $\phi T$ becomes low. The counter 22 is loaded with "0" in synchronism with the pulses $\phi 0$.

Irrespective of the parity signal P(l), the address RA5 is at "0" while the D-FF 27 is set. Therefore, the datum RD0 becomes "0" every 10th time. Accordingly, the counter 22 is loaded with "0" every 10th time and repeats the countup from 0 to 9. Meanwhile, the pulse signal $\phi T$ is applied via the counter 25 and the inverter 31. Therefore, countup is performed in synchronism with the fall of the pulse signal $\phi T$. This causes a change in the count value of the counter 25 and, accordingly, a change in the parity signal P(l). While the counter 25 counts from 0 to 7, the pulse signals $\phi T$, $\phi L$, $\phi 1$, $\phi 2$ and $\phi S'$ are produced as pulse waveforms as shown in FIGS. 3(b) to 3(h).

When the count value of the counter 25 becomes $l=7$, the output level of the 3-input type AND circuit 38 goes high. The output of the 3-input type AND circuit 38 is applied to "D" terminal of the D-FF 40, and the D-FF 40 is set with the next fall of the pulse signal $\phi 0$ (i.e. delayed one clock of $\phi 0$ with this D-FF 40). The output of the D-FF 40 is applied to the AND circuit 37 and indicates the last integration cycle. At the end of the last integration cycle, the pulse signal $\phi S'$ is produced via the AND circuit 37 as the signal $\phi S$. Meanwhile, a pulse which is synchronized with the pulse signal $\phi T$ passes through the AND gate 36 via the inverter 31. The NOR gate 33 passes the pulse from the gate 36 to the counter 25, the NOR gate 34 passes it to the counter 22, and the NOR gate 35 passes it to the D-FF 27. This resets the respective counters 25 and 22 and the D-FF 27.

With the D-FF 27 thus reset, when the level of its terminal $\overline{Q}$ becomes high the address RA5 becomes "1" and all the data of the ROM become "0". Accordingly, all the outputs of the register 24 also go low to complete a synchronous integration operation. The pulse signal $\phi S$ is a sample-and-hold pulse for detecting a signal D upon completion of the synchronous integration. This pulse causes the sample-and-hold circuit 12 to hold a signal OS.

The parity generating circuit 26 operates according to the pulse signal $\phi T$ and the count value of the counter 25. The circuit 26 performs parity check and determines which of the integration modes is to be adopted first according to the signals $\phi 1$ and $\phi 2$.

A light source energized by a commercial power supply which normally varies at a frequency of 100 Hz or 120 HZ, produces flickering of the external light which can be regarded as linear variations with the integration period suitably selected. Therefore, in accordance with the embodiment described above, the external light of a commercial power source can be adequately removed.

Further, in the specific embodiment the no-light projected integration mode and the light projected integration mode are each repeatedly carried out 8 times for removal of the external light which varies linearly. If the external light varies along a curve of R-th order, the parity generating circuit 26, the counter 25 and the ROM 25 are of course adjusted in a suitable manner, the details of which are omitted here.

The embodiment described is capable of substantially removing the adverse effect of the external light with a simple arrangement because the external light removal can be carried out by just determining which of the integration modes is to be allowed to precede the other, the light projected integration mode or the no-light projected integration mode, during the process in which the integration modes are alternately repeated. Therefore, the arrangement described furnishes a processing system of excellent S/N ratio.

In a second embodiment of this invention, a light projection signal detecting device minimizes detecting error that is caused by the varying quantity of ambient light during the process of detecting a projected signal light with periods of light projection and no light projection.

FIG. 11 shows the operating principle of this light projection detecting device. In FIG. 11, a reference symbol CF2 shows control pulses arranged to control the light flux to be projected from light projecting means. The pulse signal CF2 indicates the light projecting state of the light projecting means when it is high and a no light projecting state when it low. A symbol PA2 shows a condition in which the ambient light remains unchanged in terms of time. The condition PA2 includes a light projecting section between times t20 and t21; a no light projecting section between times t21 and t22; another no light projecting section between times t22 and t23; and another light projecting section between times t23 and t24. The light projection-and-no light projection period and the no light projection-and-light projection period to take place alternately as shown as FIG. 11. This arrangement enables the embodiment to accurately detect the true projected light signal, which is the difference between an integration signal obtained under a light projected condition and an integration signal obtained under a no light projected condition, not only when the ambient light quantity remains unchanged but also even when the ambient light quantity varies, for example, as shown at PD2 in FIG. 11.

The embodiment of the invention thus has an extremely small drift of an output signal ID2 at points of time t22, t24, t25, t26 and t27 as shown in FIG. 11.

Figure 12A:
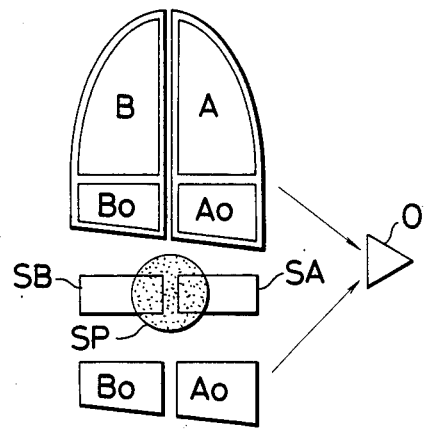
FIGS. 12(a), 12(b) and 12(c) are illustrations showing a light receiving member of the circuit of FIG. 10 in relation to the amount of integration.
Figure 12B:
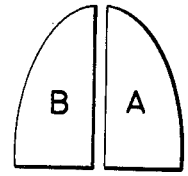
Figure 12C:
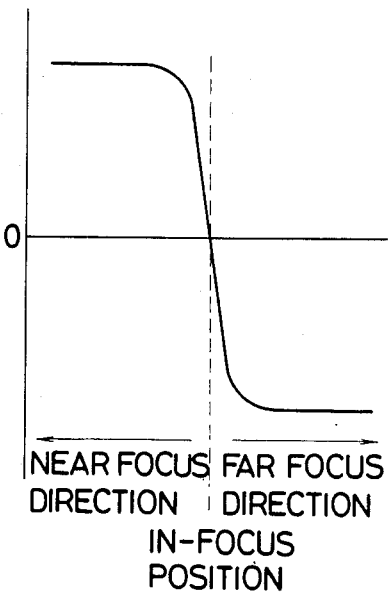

FIG. 10 shows another embodiment, wherein the synchronous integration shown in the graph of FIG. 11 is applied to a focus detecting apparatus such as a camera. The operating principle of the invention when it is applied to a focus detecting apparatus such as a camera is as shown in FIGS. 12(a), 12(b) and 12(c). In FIGS. 12(a) and 12(b) reference symbols SA and SB denote photo-electric conversion elements which form light receiving means arranged to detect reflected light coming from an object. A reflected light spot SP is formed when a light projected from light projecting means which is not shown is reflected by the object. The reflected light spot SP is arranged to shift its position horizontally as viewed on FIG. 12(a) according to the focused state of an objective lens, such as a photo taking lens of a camera, which is not shown here. The details of arrangement for shifting the reflection light spot in this manner is well known, example, from Japanese Laid-Open Patent Applications Nos. SHO 54-151829, SHO 54-155832, etc. and thus require no detailed description here. The photo-electric conversion elements SA and SB are arranged to have the center of the reflection light spot SP lie on the boundary between them when the objective lens is in-focus. FIG. 12(a) shows the relative positions of these photo-electric conversion elements SA and SB and the reflected light spot SP obtained when the objective lens is in-focus.

Reference symbols A and B conceptually denote the output amounts of the true projected light signal obtained from these photo-electric conversion elements SA and SB as a result of the reflected light spot SP. Meanwhile, symbols Ao and Bo also conceptually denote output amounts of the two photo-electric conversion elements SA and SB obtained due to ambient light. The photo-electric conversion elements SA and SB respectively produce output amounts (A+Ao) and (B+Bo) when the light is projected and output amounts Ao and Bo when the light flux is not projected. In accordance with this invention, the output amounts Ao and Bo are subtracted from the output amounts (A+Ao) and (B+Bo) which are held at a first and second integrating arrangements respectively. This subtraction produces output amounts A and B as shown in FIG. 12(b). Accordingly, we obtain cumulative sum $\Sigma A$ or $\Sigma B$ of each of the output amounts A and B with a repeated light projection process and a no light projection process. The cumulative sums $\Sigma A$ and $\Sigma B$ are then also held in the respective first and second integrating means.

The embodiment described hereinafter determines the focusing condition of the objective lens by using the cumulative sums $\Sigma A$ and $\Sigma B$. In FIG. 12(c), the objective lens is in focus when sums are in a relation $\Sigma A = \Sigma B$; to be in near focus (focused to closely) when $\Sigma A > \Sigma B$ and to be in far focus i.e. focused too far away when $\Sigma A < \Sigma B$. In this instance, if $\Sigma A + \Sigma B$ is kept constant, the inclination of $\Sigma A - \Sigma B$ is preferably arranged to be nearly unvarying in the neighborhood of the in-focus position of the lens, so that the focusing accuracy can be kept unvarying.

In FIG. 10, the photo-electric conversion elements SA and SB are silicon photo diodes. A light emitting LD serves as light projecting means. Capacitors CA and CB serve as first and second integrating means. Analog gates AG1–AG4 and BG1–BG4 form a differential circuit. The light emitting element LD receives current from a power source Vcc via a resistor RL and is grounded via a transistor Tr1. Clock pulse $\phi$IR turn the transistor Tr1 on and off via a buffer amplifier BA.

Turning the transistor Tr1 on and off causes the light emitting element LD to emit modulated light. The light from the element LD is projected on an object OB. Analog gates AG1 and BG1 each ground. One terminal of one of the photo-electric conversion elements SA and SB. Analog gates AG4 and BG4 each connect the other terminal of the elements SA and SB to the inverting input terminal of a high impedance input operational amplifier MA or MB. Analog gates AG2 and BG2 each connect the other terminal of each of the elements SA and SB to the inverting input terminal of the operational amplifier MA or MB. Analog gates AG3 and BG3 ground the other terminal of elements SA and SB. The noninverting input terminals of the operational amplifiers MA and MB are grounded. The capacitors CA and CB are disposed in the feedback loops of the operational amplifiers MA and MB. Analog gates AG5 and BG5 are arranged in parallel with the capacitors CA and CB respectively to be turned on by the pulse signal $\phi C$. Resistors RA1 and RB1 each have a resistance value R and are arranged to have an output value of $\frac{1}{2}(\Sigma A + \Sigma B)$ at a connecting point between them. Resistors RA2, RA3, RB2 and RB3 and an operational amplifier BP form a differential amplification circuit which produces an output ($\Sigma A - \Sigma B$).

An oscillator OSC generates clock pulses. A frequency divider DIV frequency divides the clock pulses. An RST flip-flop RF1 receives the output the frequency divider DIV at its input terminal T. A D-type flip-flop DF1 latches the output of a comparator CP. Members IN1–IN4 are inverters. One-shot circuits ON-1–ON4 are synchronized to the rise of input pulses. An OR gate OR, AND gates AN1 and AN2 and a pull-up resistor RC1 control the control pulses OC, OIR, OB and OA and sample-and-hold circuits SH1 and SH2. A photo taking lens control circuit CKT controls the photo taking lens on the basis of the outputs of the sample-and-hold circuits SH1 and SH2 in a well known manner.

FIG. 13(a) to 13(i) illustrate the operation of this embodiment. FIG. 13(a) to 13(i) are time graphs showing the operational timing of the essential parts of FIG. 10 in relation to the signals $\phi IR$, $\phi C$, $\phi A$ and $\phi B$. As is apparent from FIG. 13(a) to 13(l), the signal $\phi B$ has the same wave form as that of the clock pulse signal $\phi IR$ within an effective integrating section while the signal $\phi A$ has a wave form inverse to that of the signal $\phi B$. In other words, the signal $\phi B$ is low when the signal $\phi A$ is high and is high when the latter is low.

When a normally-open type focus detection switch SW1 which is shown in FIG. 10 turns on at a time t0, it sets the RST flip-flop RF1 in synchronism with the rising edge of the next pulse produced by the frequency divider DIV at a time t1. At the time t1, therefore, a one-shot pulse is produced by the one-shot circuit ON1 to reset the capacitors CA and CB via the analog gates AG5 and BG5. After that, at a time t2 which is a midpoint between time points t1 and t3, the level of the signal $\phi C$ changes to a low level concurrently with the change in the level of the output of the one-shot circuit ON1 to a low. Then, the analog gates AG5 and BG5 turn off. This causes the capacitors CA and CB to begin to integrate photo currents generated at the photo-electric conversion elements SA and SB. During a period between the time points t2 and t3, when the signal $\phi IR$ is high, the light emitting element LD lights up. Therefore, the photo-electric conversion elements SA and SB receive reflected light from an object as a result of the light projection, together with the ambient light. At this time, the signal $\phi B$ is high. The analog gates AG3, AG4, BG3 and BG4 turn on, and the photo current amounts (A +Ao) and (B +Bo) corresponding to the received light are integrated by the capacitors CA and CB, respectively.

Between times t3 and t4, the signal $\phi IR$ is low. The light omitting element LD remains extinguished. Meanwhile, only the ambient light strikes the photoelectric conversion elements SA and SB. Since the signal $\phi A$ is high during this period, the analog gates AG1, AG2, BG1 and BG2 turn on, and the photo current amounts Ao +Bo are integrated by the capacitors CA and CB, respectively.

At the time t4, therefore, each of the capacitors CA and CB holds a photo current flow amount A or B. This corresponds to a difference between the photo current flow amount (A +Ao) or (B +Bo) which is integrated during the period between the times t2 and t3 and the photo current flow amount Ao or Bo which is integrated during the period between the time points t3 and t4. That is, a photo current flow amount A or B which is proportional to the incident rate of the reflection light resulting from light projection and coming to the photoelectric conversion element SA or SB. These values A and B are based upon a first integration during half of a projection period t2 and t3 and a second integration during half of a space period t3 to t4.

Between times t4 and t5, signals generated at and obtained from the photo-electric conversion elements while the signal light is not projected are integrated. Between the time t5 and t6, signals obtained from the photo-electric conversion elements while the signal light is projected are integrated in the reverse direction. This reversal is contrary to the integrating sequence during the time t2 to t4. Between times t4 and t6 the values A and B are based upon a first integration during half of a space period (no light signal) t4 to t5, followed by half a projection period (light projection) t5 to t6. The reversal allows reduction of any error that results from variations in the ambient light to a minimal degree. With the light emitting element LD be periodically lighted up and extinguished in a repeating manner according to the pulse signal $\phi IR$, the true projected light signals, that is, a cumulative sum $\Sigma A$ of the photo current amount A and a cumulative sum $\Sigma B$, of the other photo current amount B can be produced at the respective output terminals of the operational amplifiers MA and MB approximately in a real time manner.

Assuming that a total sum ($\Sigma A +\Sigma B$) of the cumulative sums $\Sigma A$ and $\Sigma B$ of true projected light signals reach a reference level, for example, at a time t8, the output level of the comparator CP changes to high. The level of the terminal Q of the flip-flop DF1 then changes to high. The one-shot circuits ON2 and ON3 produce one-shot pulses to cause the pulse signals $\phi B$ and $\phi A$ go low via the inverters IN2 and IN3 and AND gates AN1 and AN2 respectively. With the levels of signals $\phi B$ and $\phi A$ having become low, further light signals are stopped from being integrated.

Between times t8 and t9, the focusing state of an objective lens is determined by using a difference output value ($\Sigma A - \Sigma B$) produced by the operation amplifier BP and the lens is moved for focusing as necessary. The control arrangement to detect the focusing from an output difference ($\Sigma A - \Sigma B$) which is obtained when an output sum total ($\Sigma A + \Sigma B$) reaches a predetermined value is well known, for example, from Japanese Laid-Open Patent Application No. SHO 57-175904 and, therefore, requires no further description here.

Between the times t9 and t10, a one-shot pulse is produced from a one-shot ON4 to swing the level of the signal $\phi C$ to high. This turns on the analog gates AG5 and BG5 to clear the capacitors CA and CB. Then, a next focus detection process begins at the time t10.

Information concerning the determination made on the basis of the total sum ($\Sigma A - \Sigma B$) for a period from the time t0 to another time t10 and the difference between cumulative sums ($\Sigma A - \Sigma B$) is held at the sample-and-hold circuits SH1 and SH2 until new focus determining information is obtained.

Figure 19:
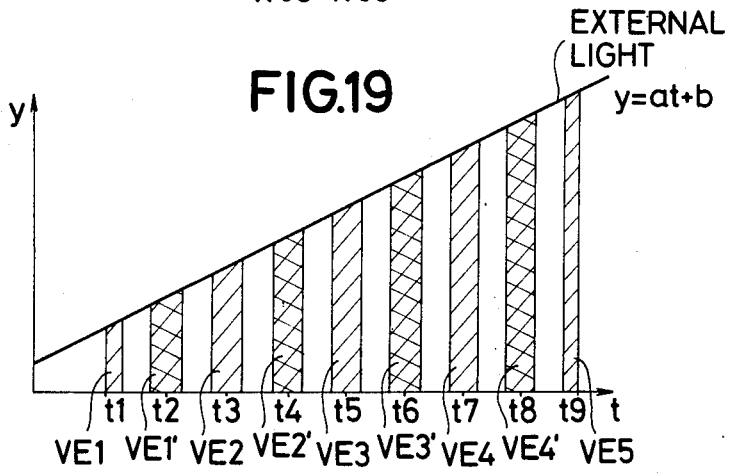
FIG. 19 is a graph showing a synchronous integrating operation performed in accordance with this invention.

A principle of another example of the synchronous integration method according to this invention is shown in FIG. 19. It is assumed that an integrating process in a precedent integrating mode which first has reflected light of an object integrated in a no light projected condition is to be repeated (N +1) times. It is also assumed that another integrating process in an ensuing integrating mode which follows the precedent mode is to have reflected light of the object integrated under while light is projected is to be repeated N times. Then, the integrating time of the first repeating step or cycle and that of the (N +1)th repeating step are arranged to be $\frac{1}{2}$ of the integration time X$\tau c$ of the normal integrating time. This arrangement can completely remove external light which varies linearly. The operating principle of this external light removal is as follows: In the case of FIG. 19, the integrating mode repeating a number of times N is shown as 4 for the sake of illustration. However, this number N may be any number as long as it is an integer.

(1) Assuming that the integration time at the first step of the precedent integration mode is from a time t1 to a time $t1 + X\tau c/2$, the first integration step becomes $t1+X\tau c/2 = t1+X\tau$ because $\tau c = 2\tau$.

(2) Since the integration time of each repeating step is fixed, the integration at the (N+1)th step in the precedent integration mode is accomplished during a period between a time $$t_{2N+1} + \frac{X\tau c}{2}$$

and another time $t_{2N+1}$. This can be reduced to $$t_{2N+1} + \frac{X\tau c}{2} = t_{2N+1} + X\tau.$$

(3) The integration at a j-th ($2 \leq j \leq N$) in the precedent integration mode is accomplished during a period between times $t_{2j-1} - X\tau$ and $t_{2j-1} + X\tau$.

Meanwhile, the integration at a j-th step ($a \leq j \leq N$) in the ensuing integration mode is accomplished during a period between time points $t_{2j} - X\tau$ and $t_{2j} + X\tau$.

When the integration in these integration modes is repeated N times, therefore, the detection error E of the cumulative sums becomes:

$$E = \sum_{j=1}^{N+1} VEj - \sum_{j=1}^{N} VEj'$$

$$= \int_{t1}^{t1+X\tau}(at+b)dt + \sum_{j=2}^{N}\int_{t_{2j-1}-X\tau}^{t_{2j-1}+X\tau}(at+b)dt +$$

$$\int_{t_{2N+1}-X\tau}^{t_{2N+1}}(at+b)dt - \sum_{j=1}^{N}\int_{t_{2j}-X\tau}^{t_{2j}+X\tau}(at+b)dt$$

$$= \sum_{j=1}^{N}\int_{t_{2j-1}}^{t_{2j-1}+X\tau}(at+b)dt +$$

$$\sum_{j=1}^{N}\int_{t_{2j+1}-X\tau}^{t_{2j+1}}(at+b)dt -$$

-continued $$\sum_{j=1}^{N}\int_{t_{2j}}^{t_{2j}+X\tau}(at+b)dt - \sum_{j=1}^{N}\int_{t_{2j}-X\tau}^{t_{2j}}(at+b)dt$$

$$= \sum_{j=1}^{N}\left\{\left[\frac{a}{2}t^2 + bt\right]_{t_{2j-1}}^{t_{2j-1}+X\tau} - \left[\frac{a}{2}t^2 + bt\right]_{t_{2j}}^{t_{2j}+X\tau}\right\} +$$

$$\sum_{j=1}^{N}\left\{\left[\frac{a}{2}t^2 + bt\right]_{t_{2j+1}-X\tau}^{t_{2j+1}} - \left[\frac{a}{2}t^2 + bt\right]_{t_{2j}-X\tau}^{t_{2j}}\right\}$$

$$= \sum_{j=1}^{N}\left\{\left(aX\tau t_{2j-1} + bX\tau - \frac{aX^2\tau^2}{2}\right) - \left(aX\tau t_{2j} + bX\tau - \frac{aX^2\tau^2}{2}\right)\right\} +$$

$$\sum_{j=1}^{N}\left\{\left(aX\tau t_{2j+1} + bX\tau - \frac{aX^2\tau^2}{2}\right) - \left(aX\tau t_{2j} + bX\tau - \frac{aX^2\tau^2}{2}\right)\right\}$$

$$= \sum_{j=1}^{N} 2aX\tau(t_{2j-1} - t_{2j}) + \sum_{j=1}^{N} 2aX\tau(t_{2j+1} - t_{2j})$$

$$= 2aX\tau^2 N - 2aX\tau^2 N$$

$$= 0$$

The above confirms that the detection error E becomes zero as long as the external light varies linearly. Therefore, where the variations in the external light can be approximated by a straight line, the detection error E becomes a small value to permit highly accurate removal of the external light.

The light of the light source generally employed fluctuates at 100Hz or 120Hz. When observed over a short period of time, therefore, this can be regarded as a linear change in the external light. Therefore, with the values N and $\tau$ suitably selected, the fluctuations of the external light can be regarded as a linear functional change when the integration in the integration modes is repeated a predetermined number of times. The external light thus can be completely removed.

The integration time at the first repeating step and at the (N+1)th step is arranged to be $\frac{1}{2}$ in the example described. The purpose of removing the external light can be attained by replacing the integrating time with $\frac{1}{2}$ integrating time at the beginning and the end of the integrating operation. The reason for this is similar to the arrangement of the preceding example and, therefore, does not require further description. The $\frac{1}{2}$ integration time does not have to be exact.

Figure 14:
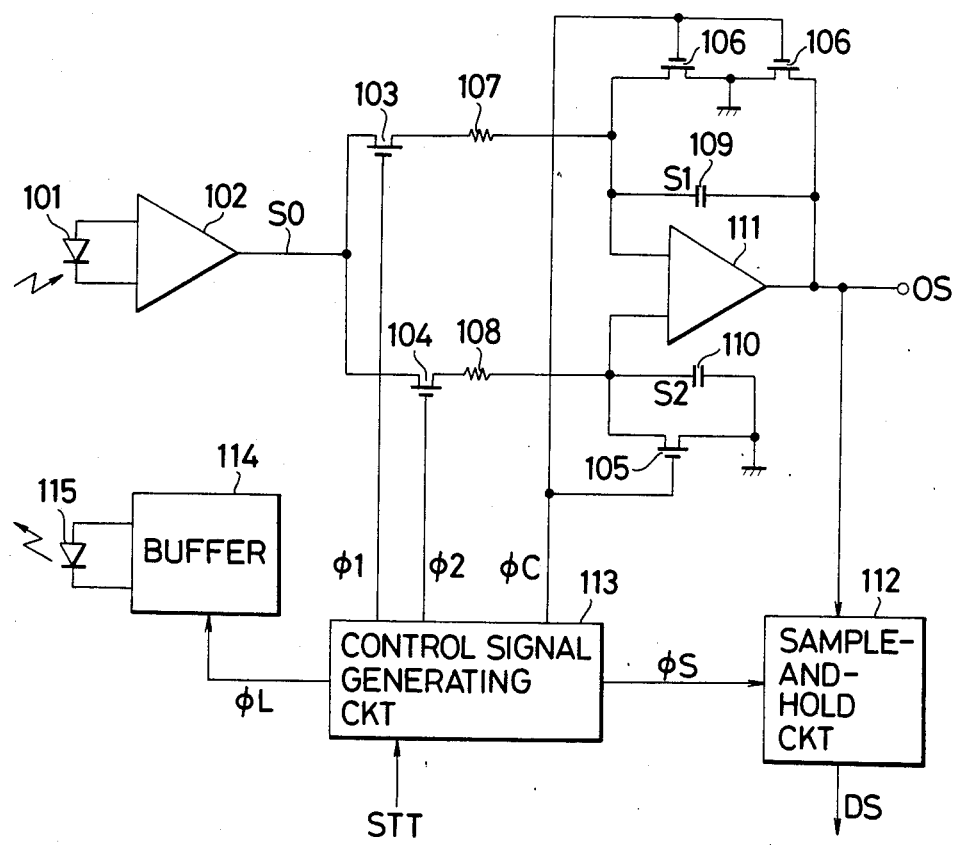
FIG. 14 is a block diagram showing another modification of the device embodying features of this invention.
Figure 15:
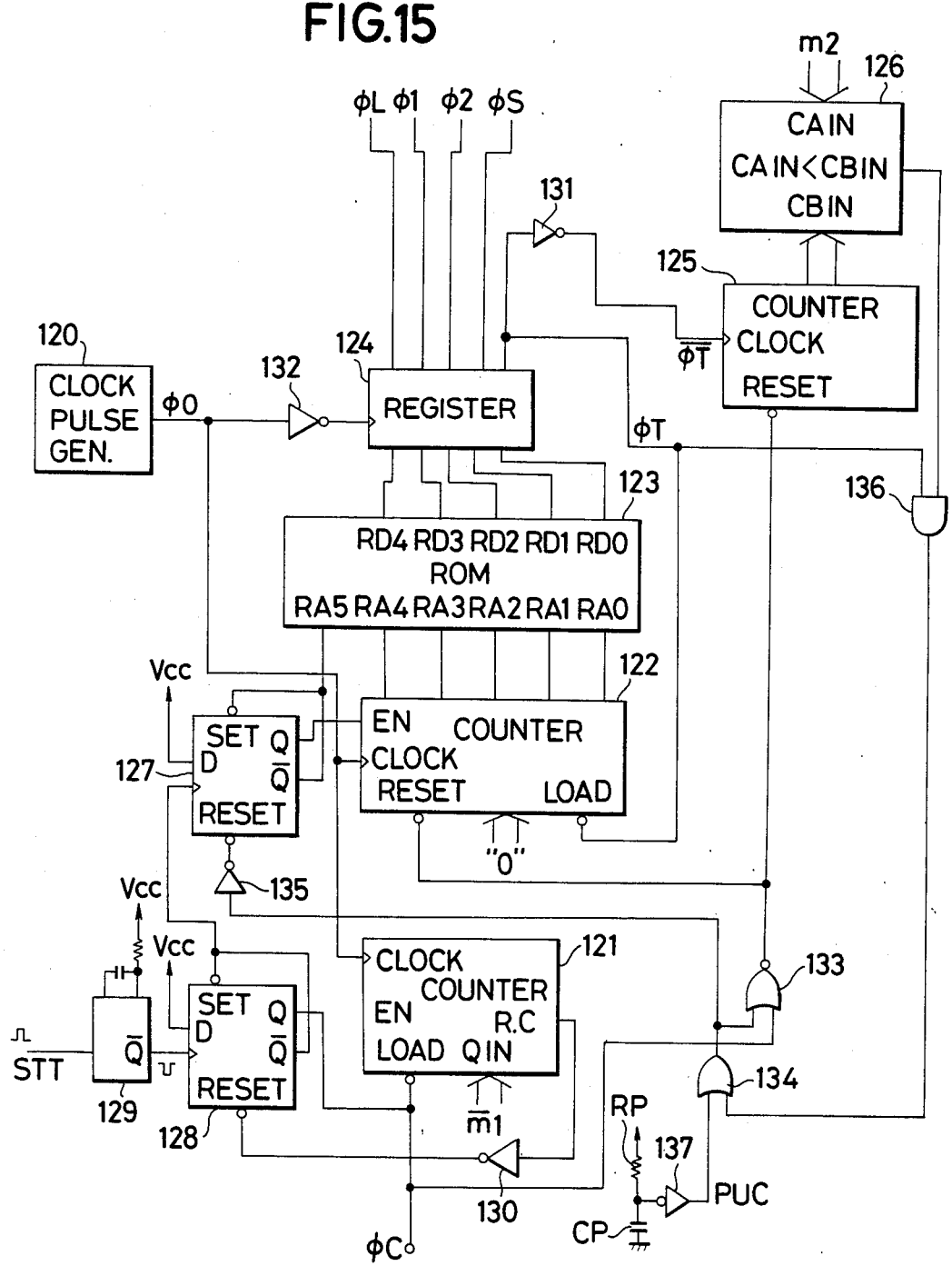
FIG. 15 is a circuit diagram showing the control signal generating circuit of the block diagram of FIG. 14.
Figure 17:
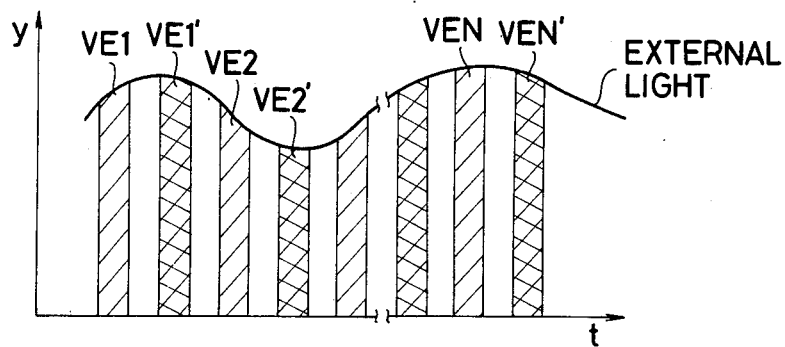
FIG. 17 is a graph showing a synchronous integrating operation performed under varying conditions of external light.
Figure 18:
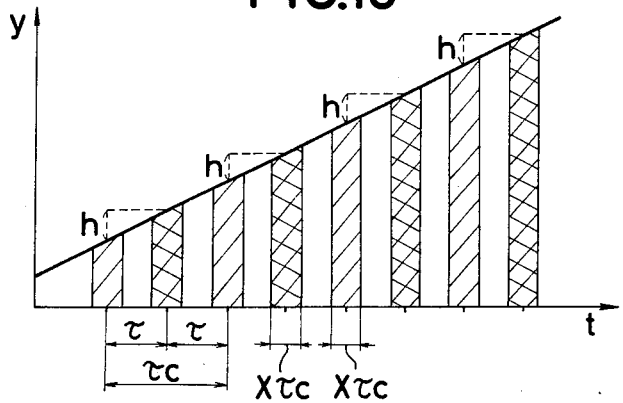
FIG. 18 is a graph showing a synchronous integrating operation performed under linearly varying conditions of external light.

FIGS. 14 and 15 show a synchronous integrating device using the above stated synchronous integrating method according to this invention. Referring to FIG. 14, the illustration includes a light receiving photo-sensitive sensor 101 which is arranged to receive reflected light coming from an object; a pre-amplifier 102; analog switches 103-106; resistors 107-108; integrating capacitors 109 and 110; an amplifier 111; a sample-and-hold circuit 112; a control signal generating circuit 113; a light source driving buffer 114; and a light source 115 arranged to project a signal light flux on the object. A signal So is detected by the photo-sensitive sensor 101. The integrating capacitor 109 produces a signal S1 by accumulating the signal So obtained under when the signal light is not projected. A signal S2 is obtained by the integrating capacitor 110 accumulating the signal So obtained when the signal light is projected. A signal OS is produced by the amplifier 111. A sampling pulse signal $\phi S$ samples the signal OS. A clear pulse signal $\phi C$ resets the integrating capacitors 109 and 110. Gate control pulses $\phi 1$ and $\phi 2$ open and close analog gates 103 and 104 according to different integration modes. A pulse signal $\phi L$ serves for driving the light source. The output Ds of the sample-and-hold circuit 112 corresponds to a difference output obtained after completion of a synchronous integration operation.

FIG. 15 shows by way of example the details of the control signal generating circuit 113 shown in FIG. 14. This illustration includes a clock pulse generator 120 which is arranged to generate a reference clock signal $\phi 0$; counters 121 and 122; a ROM (a read only memory); a register 124; a counter 125; a comparator 126; D flip-flops (D-FF's) 127 and 128; a monostable multivibrator 129; inverters 130, 131 and 132; a NOR gate 133; an OR gate 134; an inverter 135; an AND gate 136; an inverter 137; a resistor RP; and a capacitor CP.

The ROM 123 has data written therein as shown in Table 2 below, wherein the data RD0, RD1, RD2, RD3 and RD4 respectively correspond to the signals $\phi T$, $\phi S$, $\phi 2$, $\phi 1$, and $\phi L$.

TABLE 2

| Addresses | | | | | | Data | | | | |
|---|---|---|---|---|---|---|---|---|---|---|
| RA5 | RA4 | RA3 | RA2 | RA1 | RA0 | RD4 | RD3 | RD2 | RD1 | RD0 |
| 0 | 0 | 0 | 0 | 0 | 0 | 0 | 1 | 0 | 0 | 1 |
| 0 | 0 | 0 | 0 | 0 | 1 | 0 | 1 | 0 | 0 | 1 |
| 0 | 0 | 0 | 0 | 1 | 0 | 0 | 1 | 0 | 0 | 1 |
| 0 | 0 | 0 | 0 | 1 | 1 | 0 | 0 | 0 | 0 | 1 |
| 0 | 0 | 0 | 1 | 0 | 0 | 0 | 0 | 0 | 0 | 1 |
| 0 | 0 | 0 | 1 | 0 | 1 | 1 | 0 | 0 | 0 | 1 |
| 0 | 0 | 0 | 1 | 1 | 0 | 1 | 0 | 0 | 0 | 1 |
| 0 | 0 | 0 | 1 | 1 | 1 | 1 | 0 | 1 | 0 | 1 |
| 0 | 0 | 1 | 0 | 0 | 0 | 1 | 0 | 1 | 0 | 1 |
| 0 | 0 | 1 | 0 | 0 | 1 | 1 | 0 | 1 | 0 | 1 |
| 0 | 0 | 1 | 0 | 1 | 0 | 1 | 0 | 1 | 0 | 1 |
| 0 | 0 | 1 | 0 | 1 | 1 | 1 | 0 | 1 | 0 | 1 |
| 0 | 0 | 1 | 1 | 0 | 0 | 1 | 0 | 1 | 0 | 1 |
| 0 | 0 | 1 | 1 | 0 | 1 | 1 | 0 | 0 | 0 | 1 |
| 0 | 0 | 1 | 1 | 1 | 0 | 1 | 0 | 0 | 0 | 1 |
| 0 | 0 | 1 | 1 | 1 | 1 | 0 | 0 | 0 | 0 | 1 |
| 0 | 1 | 0 | 0 | 0 | 0 | 0 | 0 | 0 | 0 | 1 |
| 0 | 1 | 0 | 0 | 0 | 1 | 0 | 1 | 0 | 0 | 1 |
| 0 | 1 | 0 | 0 | 1 | 0 | 0 | 1 | 0 | 0 | 1 |
| 0 | 1 | 0 | 0 | 1 | 1 | 0 | 1 | 0 | 1 | 0 |
| Others | | | | | | 0 | 0 | 0 | 0 | 0 |
| | | | | | | $\phi L$ | $\phi 1$ | $\phi 2$ | $\phi S$ | $\phi T$ |
| | | | | | | Corresponding Signals | | | | |

In operation, when the synchronous integration start pulse STT arrives at the control signal generating circuit 113 of FIG. 14, the clear pulse signal $\phi C$ is first produced to clear the electric charge signals of the integrating capacitors 109 and 110 via the gates 105 and 106. Then, the light source driving signal $\phi L$ is applied via the buffer 114 to the light source 115. The light of the light source 115 flickers (turns on and off) on the basis of the signal $\phi L$. In synchronism with the flicker of the light of the light source, the gate control pulses $\phi 1$ and $\phi 2$ are applied to the gates 103 and 104. In the signal light projected integration mode, the gate 104 is opened by the pulse $\phi 2$ to allow the output signal So of the pre-amplifier 102 to be accumulated by the integrating capacitor 110 via the resistor 108. In another integration mode with no light projected from the light source 115 (or a no signal projected integration mode), the gate 103 is opened by the gate control pulse $\phi 1$ to allow the signal So to be accumulated at the integrating capacitor 109 via the resistor 107. The signal So is repeatedly accumulated at the capacitors 109 and 110 in synchronism with the pulses $\phi 1$ and $\phi 2$ as shown in FIGS. 16(e), 16(f), and 16(h). Accumulation signals S1 and S2 which are thus obtained gradually increase as shown in FIG. 16(i) and 16(j). Meanwhile, the amplifier 111 obtains a difference between the accumulated or integrated signals S1 and S2 and produces the difference signal OS as in FIG. 16(k). When the integration is repeated a predetermined number of times, all the pulse signals $\phi L$, $\phi 1$, $\phi 2$, $\phi C$, and $\phi S$ become "0" and the synchronous integration ends. Then, the signal OS or DS is produced as a result of the synchronous integration. Further, the sample pulse $\phi S$ of FIG. 16(l) has the interim results of the synchronous integration applied to the output DS of the sample-and-hold circuit and to have the difference signal OS sampled by the sample-and-hold circuit 112 at the timing defined by the signal $\phi S$. Further, the product of the resistance R7 of the resistor 107 and the capacitance C9 of the capacitor 109 which is expressed as $\tau RC1 = R7C9$ is equal to the product $\tau RC2 = R8C10$ of the resistance value R8 of the resistor 108 and the capacity C10 of the capacitor 110.

In FIG. 15, when the synchronous integration start pulse STT of FIG. 16(a) is supplied to the monostable multivibrator 129, the terminal $\overline{Q}$ of the multivibrator 129 generates a negative pulse output. The D flip-flop (D-FF) 128 is set by the rise of this pulse and the output Q of the D-FF 128 becomes "1".

The terminal "load" of the counter 121 is at a level "0" before the D-FF 122 is set. Therefore, the counter 121 is loaded with a suitable value ml by the reference clock pulse signal $\phi 0$ which comes via the input terminal "clock" thereof The counter 121 does not count while the terminal "load" is at "0". When the Q output of the D-FF 128 becomes "1", the terminal "load" of the counter 121 becomes "1" and the clock pulse signal $\phi C$ of FIG. 16(k) causes the counter 121 to count up. The count value of the counter 121 reaches a maximum value when the up count occurs ml times. Then, the ripple-through carry R.C. of the counter becomes "1". As a result of this, the reset terminal of the D-FF 128 becomes "0" to have the D-FF 128 reset. The Q output of the D-FF 128 becomes "0". This causes the terminal load of the counter 121 to become "0". The counter 121 is then loaded with the value ml and no longer counts up.

When the clear pulse signal $\phi C$ becomes "1", the counters 122 and 125 are reset from whatever states they may be in. These counters are also arranged to be reset when power supply is switched on by the output PUC of a power-up-clear circuit which is composed of the resistor RP, the capacitor CP and the inverter 137. The output PUC of the power-up-clear circuit also resets the D-FF 127 via the OR gate 134 and the inverter 135.

When the reset pulse signal φC falls, the output Q̄ of the D-FF 128 changes from "0" to "1". A rising pulse is applied to the clock terminal of the D-FF 127 to set the D-FF 127. This enables the counter 122 to count upward in response to the pulse signal φ0. In its initial state, the counter 122 is reset at a count value zero. Therefore, it begins to count up from zero.

The output of the counter 122 is applied to the addresses RA0–RA4 of the ROM 123 to cause these addresses of the ROM 123 to increase one after another. The state of another address RA5 is determined by the D-FF 127. The address RA5 is at "0" while the D-FF 127 is set, that is, while the synchronous integration is in process. The address RA5 becomes "1" when the D-FF 127 is reset. Accordingly, all the addresses RA0–RA5 are at "0" immediately after the pulse signal φC falls. At that time, the data RD0 and RD3 of the ROM 123 are at "1" while the other data RD1, RD2, and RD4 are at "0". The data RD0–RD4 are entered into and produced from, the register 124 in synchronism with the fall of the pulse signal φ0. The data RD0 of the ROM 123 correspond to the pulse signal φT. The pulse signal φT becomes "1" when the pulse signal φ0 falls while the count output of the counter 122 is "0". Therefore, the counter 122 is at that time released from a loaded state and count up when the pulse signal φ0 rises next time. The datum RD0 is at "1" while the input address of the ROM is between 000000–010010. Therefore, a count up is performed during this period. The datum RD0 becomes "0" when the input address of the ROM becomes 010011. When the clock pulse signal φ0 falls the next time, the pulse signal φT becomes "0" to bring the counter 122 into a state in which it can be loaded. Then, another rise of the clock pulse signal φ0 causes the counter 122 to be loaded with zero. The input address of the ROM then becomes 000000 to make the output of datum RD0 "1". Another fall of the clock pulse signal φ0 causes the signal φT to become "1" to unload the counter 122. In this manner, the counter 122 counts up from 000000 to 010011 and then comes back to 000000 to repeat the count up process. The data RD0–RD4 which are produced from the ROM 123 following the count up process of the counter 122 are written into the register 124 according to the fall of the clock pulse signal φ0 and thus, exhibits waveforms as shown in FIGS. 16(a) to 16(f) and 16(l).

When the clock pulse φ0 falls after the count value of the counter 122 becomes 010011, the pulse signal φT becomes "0". Then the output φT of the inverter 131 rises. This is counted by the counter 125 as a number of repeating times. The counter 125 is initially set a "0" and reaches a count value "1" when the pulse signal φT rises for the first time. The counter 125 thus counts up as the pulse signal φT rises. The count output of the counter 125 is applied to one input terminal CBin of the comparator 126. Meanwhile, a predetermined number m2 has been applied to the other input terminal CAin of the comparator 126. A terminal "CAin<CBin" of the comparator 126 produces a "1" when a condition of CAin<CBin obtains. Accordingly, the output from the terminal "CAin<CBin" of the comparator 126 is "0" when the count number 1 of the counter 125 is 1≦m2 and becomes "1" only when the count number becomes 1>m2. This value m2 is set to be m2 = N − 1. The count value of the counter 125 becomes N when the pulse signal φT is counted N times. Then, the output from the terminal "CAin<CBin" becomes "1". This output "1" causes the AND gate 136 to open. The pulse signal φT then resets the counter 125 via the AND gate 136, the OR gate 134 and the NOR gate 133. At the same time, the pulse signal φT also resets the counter 122. At this instant, the pulse signal φT is applied via the AND gate 136, the OR gate 134 and the inverter 135 to the reset terminal of the D-FF 127 to reset the D-FF 27. Then, the input address RA5 of the ROM 123 becomes "1" to cause all the data RD0–RD4 of the ROM to become "0". When the clock pulse signal φ0 rises immediately after this, the register 124 is completely cleared. All the pulse signals φL, φ1, φ2, φS and φT then becomes "0".

In the timing graphs of FIG. 16(a) to 16(l), the number N of repeating times is set a N=5. However, as will be understood from the waveform of the gate control pulse signal φ1, the first and sixth steps of the integration mode are arranged to have an integration time which is ½ of that of other steps of the integration mode. By virtue of this arrangement, the adverse effect of the external light component resulting from the flicker of the external light and particularly the linear variations thereof can be almost completely removed.

The term "space period" as used herein refers not only to a completely off conditional the projected light, but also refers to any condition in which the light intensity is reduced to such as between 10% to 50% of the projected light. The term is used in the sense of space between a mark represented by the projected light.

While embodiments of the invention have been described in detail, it will be evident to those skilled in the art that the invention may be embodied otherwise without departing from its spirit and scope.

What is claimed is:
1. A synchronous integrating device, comprising:
  projecting means for projecting a given intensity of light on an object during projection periods and reducing the intensity during space periods which occur at other times outside the projection periods;
  sensing means for sensing ambient and projected light from the object during projection periods and space periods;
  processing means responsive to said sensing means for producing space signals during the space periods and projection signals during projection periods, and for integrating a plurality of the projection signals and a plurality of the space signals; and
  timing means connected to said processing means and said projecting means for selecting the timing of projecting periods and space periods.
2. A device as in claim 1, wherein said timing means includes selecting means to cause said processing means to integrate at least one projecting signal and one space signal in a cycle, count the number of cycles, and alter the projection periods on the basis of the parity of each count.
3. A device as in claim 1, wherein said timing means includes a timer arrangement to cause said processing means to integrate at least one projecting signal and one space signal in a cycle, and to vary the order of the projecting signal and space signal from one cycle to the next cycle.
4. A device as in claim 2, wherein said timing means includes counting means for counting the number of cycles and altering means for altering the projection periods on the basis of the parity of each count.
5. A device as in claim 4, wherein said timer arrangement includes a ROM defining the order of the projecting and base signals in each cycle before alteration by said altering means.

6. A device as in claim 1, wherein said timing means includes selector means for continuously reversing the order of space signals relative to projecting signals for a plurality of pairs of space periods and projecting periods.

7. A device as in claim 1, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

8. A device as in claim 6, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

9. A device as in claim 6, wherein said integrating means is arranged for causing said processing means alternately to integrate a projection signal and a space signal for each sensor.

10. A device as in claim 9, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

11. A device as in claim 6, wherein said timing means responds to said summing means for ending the integration of said integrating means when the summing means exceeds a given level.

12. A device as in claim 10, wherein said timing means responds to said summing means for ending the integration of said integrating means when the summing means exceeds a given level.

13. A device as in claim 12, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

14. A device as in claim 1, wherein said timing means includes a timer arrangement for causing said processing means to integrate each of said projection signals and space signals in a set over predetermined times and integrate a space signal before the first projection signal of the set and a space signal after the last projection signal of the set for respective given times less than the predetermined times.

15. A device as in claim 14, wherein said timer arrangement includes a selector for selecting the number of projection signal and space signals in a set, selecting the predetermined times, and selecting the respective given time.

16. A device as in claim 14, wherein said timer arrangement causes said processing means to integrate the space signal before the first projection signal and the space signal after the last projection signal each for the given times one-half the predetermined times.

17. A device as in claim 15, wherein said timer arrangement causes said processing means to integrate the space signal before the first projection signal and the space signal after the last projection signal each for the given times one-half the predetermined times.

18. A device as in claim 14, wherein said timer includes a counter, a ROM containing the predetermined times and response to the counter, and a register for applying information from the ROM to the processing means.

19. A device as in claim 15, wherein said timer includes a counter, a ROM containing the predetermined times and responsive to the counter, and a register for applying information from the ROM to the processing means.

20. A device as in claim 16, wherein said timer includes a counter, a ROM containing the predetermined times and response to the counter, and a register for applying information from the ROM to the processing means.

21. A device as in claim 17, wherein said timer includes a counter, a ROM containing the predetermined times and response to the counter, and a register for applying information from the ROM to the processing means.

22. For a measuring device, wherein projecting means for projecting a given intensity of light on an object during projection periods and reducing the intensity during space periods which occur at other times outside the projection periods, a light integrating circuit, comprising:
sensing means for sensing ambient and projected light from the object during projection periods and space periods;
processing means responsive to said sensing means for producing space signals during the space periods and projection signals during projection periods, and for integrating a plurality of the projection signals and a plurality of the space signals and subtracting a plurality of the integrated space signals from a plurality of the integrated projection signals so as to produce measuring signals; and
timing means connected to said processing means and said projecting means for selecting the timing of projecting periods and space periods and the timing of integration of said projection signals and space signals.

23. A device as in claim 22, wherein said timing means includes selecting means to cause said processing means to integrate at least one projecting signal and one space signal in a cycle, count the number of cycles, and alter the projection periods on the basis of the parity of each count.

24. A device as in claim 22, wherein said timing means includes a timer arrangement to cause said processing means to integrate at least one projecting signal and one space signal in a cycle, and to vary the order of the projecting signal and space signal from one cycle to the next cycle.

25. A device as in claim 23, wherein said timing means includes counting means for counting the number of cycles and altering means for altering the projection periods on the basis of the parity of each count.

26. A device as in claim 25, wherein said timer arrangement includes a ROM defining the order of the projecting and base signals in each cycle before alteration by said altering means.

27. A device as in claim 22, wherein said timing means includes selector means for continuously reversing the order of space signals relative to projecting signals for a plurality of pairs of space periods and projecting periods.

28. A device as in claim 22, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

29. A device as in claim 27, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

30. A device as in claim 27, wherein said integrating means is arranged for causing said processing means alternately to integrate a projection signal and a space signal for each sensor.

31. A device as in claim 30, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

32. A device as in claim 27, wherein said timing means responds to said summing means for ending the integration of said integrating means when the summing means exceeds a given level.

33. A device as in claim 31, wherein said timing means responds to said summing means for ending the integration of said integrating means when the summing means exceeds a given level.

34. A device as in claim 33, wherein said sensing means includes a pair of sensors in the path of reflected light from the object, and wherein said processing means includes converting means for producing projection signals during the projection periods and space signals during the space periods for each of said sensors, integrating means for separately integrating a plurality of projection signals and a plurality of the space signals of each sensor and subtracting a plurality of integrated space signals for a plurality of the integrated projection signals to produce a difference for each sensor, and summing means for adding the difference.

35. A device as in claim 22, wherein said timing means includes a timer arrangement for causing said processing means to integrate each of said projection signals and space signals in a set over predetermined times and integrate a space signal before the first projection signal of the set and a space signal after the last projection signal of the set for respective given times less than the predetermined times.

36. A device as in claim 35, wherein said timer arrangement includes a selector for selecting the number of projection signal and space signals in a set, selecting the predetermined times, and selecting the respective given time.

37. A device as in claim 35, wherein said timer arrangement causes said processing means to integrate the space signal before the first projection signal and the space signal after the last projection signal each for the given times one-half the predetermined times.

38. A device as in claim 36, wherein said timer arrangement causes said processing means to integrate the space signal before the first projection signal and the space signal after the last projection signal each for the given times one-half the predetermined times.

39. A device as in claim 35, wherein said timer includes a counter, a ROM containing the predetermined times and response to the counter, and a register for applying information from the ROM to the processing means.

40. A device as in claim 36, wherein said timer includes a counter, a ROM containing the predetermined times and responsive to the counter, and a register for applying information from the ROM to the processing means.

41. A device as in claim 37, wherein said timer includes a counter, a ROM containing the predetermined times and response to the counter, and a register for applying information from the ROM to the processing means.

42. A device as in claim 38, wherein said timer includes a counter, a ROM containing the predetermined times and response to the counter, and a register for applying information from the ROM to the processing means.

43. A device as in claim 1, wherein said processing means includes subtracting means for subtracting a plurality of the integrated space signals from a plurality of the integrated projection signals so as to produce measuring signals.

44. A synchronous integrating method comprising a first integration mode which involves integrating light reflected from an object as a result of repeated signal light projection onto an object and a second integration mode which involves integrating light from the object during periods other than the periods in said first integration mode, wherein which of said first and second integration modes to precede the other at the n-th repetition of said first and second integration modes is determined in relation to the number n.

45. A synchronous integrating method as in claim 44, wherein which of said first integration mode and said second integration mode to precede the other is determined according to parity of at least part of binary digits of (n−1).

46. A synchronous integrating method having an integration mode which involves integrating light reflected from an object as a result of repeated signal light projection onto an object and an integration mode which involves integrating light from the object when light is not projected to detect the difference between integration values obtained in the two integration modes, comprising an additional integration mode both at a start area and at a finish area of repetition of the two integration modes, an integration time of said additional integration mode being shorter than that of each of the two integration modes.

47. A synchronous integrating method as in claim 46, wherein said integration time of said additional integration mode is one-half of that of each of the two integration modes.

48. A synchronous measuring device comprising:
  (a) means for generating a light flux, said means generating said light flux in a first state and a second state in which a different light flux generating state from that in said first state, is assumed;
  (b) measuring means for measuirng light from an object to be measured on which the light flux is projected from said light flux generating means; and
  (c) varying means for alternately carrying out the measuring operation of said measuring means when said generating means is in the first state and that of said measuring means when said generating means is in the second state, and for varying the measuring sequence when said generating means is respectively in the first state and in the second state after a certain number of the measuring operations respectively in the first and in the second state have been carried out.

49. A synchronous measuring device according to claim 48, wherein said second state is a state in which no light flux is generated.

50. A synchronous integrating device comprising:
  (a) means for generating a light flux, said means generating said light flux in a first state and a second state in which a different light flux generating state from said first state is assumed;
  (b) light sensing means, said light sensing means receiving light from an object to be measured on which light flux is projected from said light flux generating means;
  (c) integrating means for integrating the output of said light sensing means; and
  (d) control means for alternately carrying out an integration operation in a first mode of the output of the sensing means when the light flux generating means is in the first state for the integrating means, and an integration operation in a second mode of the output of the sensing means when the light flux generating means is in the second state for the integrating means and for varying the sequence of the integration operations in the first and second modes while said integration operations are carried out alternately.

51. A synchronous integrating device according to claim 50, wherein said second state is a state in which no light flux is generated.

52. A synchronous measuring device according to claim 48, wherein said varying means decides in relation to n whether the sequence of said measuring operation is changed over or not at the time of an n-th integration operation, respectively, in the first and in the second state.

53. A synchronous integrating device according to claim 50, wherein said control means decides, in relation to n, whether the sequence of the first and the second mode is changed over or not, at an n-th integration mode, respectively, in said first mode and in said second mode.

54. A synchronous integrating device comprising:
  (a) means for generating a light flux, said means generating said light flux in a first state and in a second state in which a different light flux generating state than in said first state is assumed;
  (b) light measuring means, said means receiving light from an object to be measured on which the light flux is projected from said light flux generating means;
  (c) an integrating means for generating the output of said light measuring means; and
  (d) control means for alternately carrying out an integration operation in a first mode by said integrating means of the output of the measuring means when the light flux generating means is in the first state, and an integration operation in a second mode by said integrating means of the output of the sensing means when the light flux generating state, and for making the time of a first integration operation and that of a last integration operation shorter than those of other integration operations.

55. A synchronous integrating device according to claim 54, wherein said second state is a state in which no light flux is generated.

56. A synchronous integrating device according to claim 50, wherein said integrating means includes first integrating means for integrating the output of the sensing means when the light flux means is in the first state, and second integrating means for integrating the output of the sensing means when the light flux generating means is in the second state.

* * * * *